US011135872B2

(12) United States Patent
Teixeira, IV

(10) Patent No.: US 11,135,872 B2
(45) Date of Patent: Oct. 5, 2021

(54) REINFORCED BICYCLE RIM

(71) Applicant: Specialized Bicycle Components, Inc., Morgan Hill, CA (US)

(72) Inventor: Charles Raymond Teixeira, IV, Bonny Doon, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 16/189,171

(22) Filed: Nov. 13, 2018

(65) Prior Publication Data

US 2019/0077191 A1      Mar. 14, 2019

Related U.S. Application Data

(63) Continuation-in-part of application No. 15/837,869, filed on Dec. 11, 2017, now Pat. No. 10,137,729.
(Continued)

(51) Int. Cl.
*B60C 15/02* (2006.01)
*B60B 21/10* (2006.01)
(Continued)

(52) U.S. Cl.
CPC .............. *B60B 25/08* (2013.01); *B60B 1/003* (2013.01); *B60B 5/02* (2013.01); *B60B 21/10* (2013.01);
(Continued)

(58) Field of Classification Search
CPC ........ B60B 21/02; B60B 21/026; B60B 21/04; B60B 21/10; B60B 21/102; B60B 21/104;
(Continued)

(56) References Cited

U.S. PATENT DOCUMENTS 2,913,034 A * 11/1959 Carter ...................... B60C 5/16
152/513
5,820,709 A    10/1998 Matsuda
(Continued)

FOREIGN PATENT DOCUMENTS

CN    202826968 U    3/2013
EP    0034454 A1    8/1981
(Continued)

OTHER PUBLICATIONS

PCT/US2015/015583 International Search Report and Written Opinion dated May 15, 2015 (7 pages).
(Continued)

*Primary Examiner* — John D Walters
(74) *Attorney, Agent, or Firm* — Michael Best & Friedrich LLP

(57) ABSTRACT

A bicycle rim assembly includes a rim defining a central plane and comprising annular inner and outer walls. The outer wall includes first and second bead seats separated by a center well. First and second annular projections are spaced laterally from each other relative to the central plane and extend substantially radially outwardly from the outer wall. Each of the annular projections includes a radially outer face and a laterally inner face. Right and left covers are spaced from each other and are preferably coupled to the rim to cover at least a portion of the laterally inner face and the radially outer face of the first and second annular projections, respectively, and also the first and second bead seats, respectively. One or both of the right and left covers can be fiber reinforced. First and second pieces of tape can be overlapped and used to secure the covers to the rim.

16 Claims, 17 Drawing Sheets

Related U.S. Application Data which is a continuation of application No. 15/118,768, filed as application No. PCT/US2015/015583 on Feb. 12, 2015, now Pat. No. 9,840,111, which is a continuation of application No. 14/179,119, filed on Feb. 12, 2014, now Pat. No. 9,440,498.

(60) Provisional application No. 62/011,384, filed on Jun. 12, 2014.

(51) Int. Cl.
*B60B 25/08* (2006.01)
*B60B 5/02* (2006.01)
*B60B 21/12* (2006.01)
*B60B 1/00* (2006.01)
*B60C 3/02* (2006.01)
B60C 29/02 (2006.01)
B60B 25/06 (2006.01)
B60B 21/02 (2006.01)
B60B 21/04 (2006.01)

(52) U.S. Cl.
CPC ............... *B60B 21/12* (2013.01); *B60C 3/02* (2013.01); *B60C 15/023* (2013.01); *B60C 15/0209* (2013.01); *B60B 21/021* (2013.01); *B60B 21/025* (2013.01); *B60B 21/026* (2013.01); *B60B 21/04* (2013.01); *B60B 21/104* (2013.01); *B60B 25/06* (2013.01); *B60B 2360/10* (2013.01); *B60B 2360/32* (2013.01); *B60B 2360/3416* (2013.01); *B60B 2360/50* (2013.01); *B60B 2900/111* (2013.01); *B60B 2900/212* (2013.01); *B60B 2900/311* (2013.01); *B60B 2900/5116* (2013.01); *B60C 29/02* (2013.01); *B60C 2200/12* (2013.01); *B60Y 2200/13* (2013.01); *Y10T 152/10747* (2015.01)

(58) Field of Classification Search
CPC ... B60B 21/108; B60B 21/12; B60B 21/1258; B60B 21/025; B60B 2900/212; B60B 25/08; B60B 25/06; B60B 1/003; B60B 21/021; B60B 2360/10; B60B 2360/32; B60B 2360/3416; B60B 2360/50; B60B 2900/111; B60B 2900/311; B60B 2900/5116; B60B 5/02; B60C 15/0209; B60C 15/0213; B60C 15/022; B60C 15/0223; B60C 15/0226; B60C 3/02; B60C 15/023; B60C 29/02; B60C 2200/12; B60Y 2200/13; Y10T 152/10747
USPC .......... 152/375, 378 R, 379.3, 379.4, 379.5, 152/381.3, 381.4, 381.5; 301/95.102
See application file for complete search history.

(56) References Cited

U.S. PATENT DOCUMENTS

| | | | | |
|---|---|---|---|---|
| 7,104,300 | B2 * | 9/2006 | Veux | B60B 21/025 152/379.4 |
| 7,464,994 | B2 * | 12/2008 | Okajima | B60B 1/041 301/58 |
| 8,544,514 | B2 * | 10/2013 | Gangloff | B60B 21/025 152/381.6 |
| 8,905,491 | B2 * | 12/2014 | Koshiyama | B60B 21/062 301/95.102 |
| 2003/0209936 | A1 | 11/2003 | Chen | |
| 2005/0089646 | A1 | 4/2005 | Endicott et al. | |
| 2009/0115240 | A1 | 5/2009 | Slate et al. | |
| 2011/0018336 | A1 | 1/2011 | Mercat et al. | |
| 2011/0204706 | A1 | 8/2011 | Erler et al. | |
| 2011/0266863 | A1 | 11/2011 | Gittani et al. | |
| 2012/0025597 | A1 | 2/2012 | Koshiyama | |
| 2013/0043717 | A1 | 2/2013 | Poertner et al. | |
| 2013/0049441 | A1 | 2/2013 | Smart | |

FOREIGN PATENT DOCUMENTS

| | | |
|---|---|---|
| JP | 2009248807 A | 10/2009 |
| KR | 101375495 B1 | 3/2014 |
| TW | M252568 U | 12/2004 |

OTHER PUBLICATIONS

PCT/US2015/015583 International Preliminary Report on Patentability dated Jan. 19, 2016 (7 pages).
Taiwan Patent Office Action for Application No. 104104790 dated Sep. 17, 2018 (6 pages, English translation included).
Taiwanese Patent Office Action for Application No. 108110312 dated Dec. 6, 2019 (22 pages including English translation).
Office Action issued from the Taiwan Patent Office for related Application No. 109134438 dated May 5, 2021 (16 Pages including English Translation).

\* cited by examiner

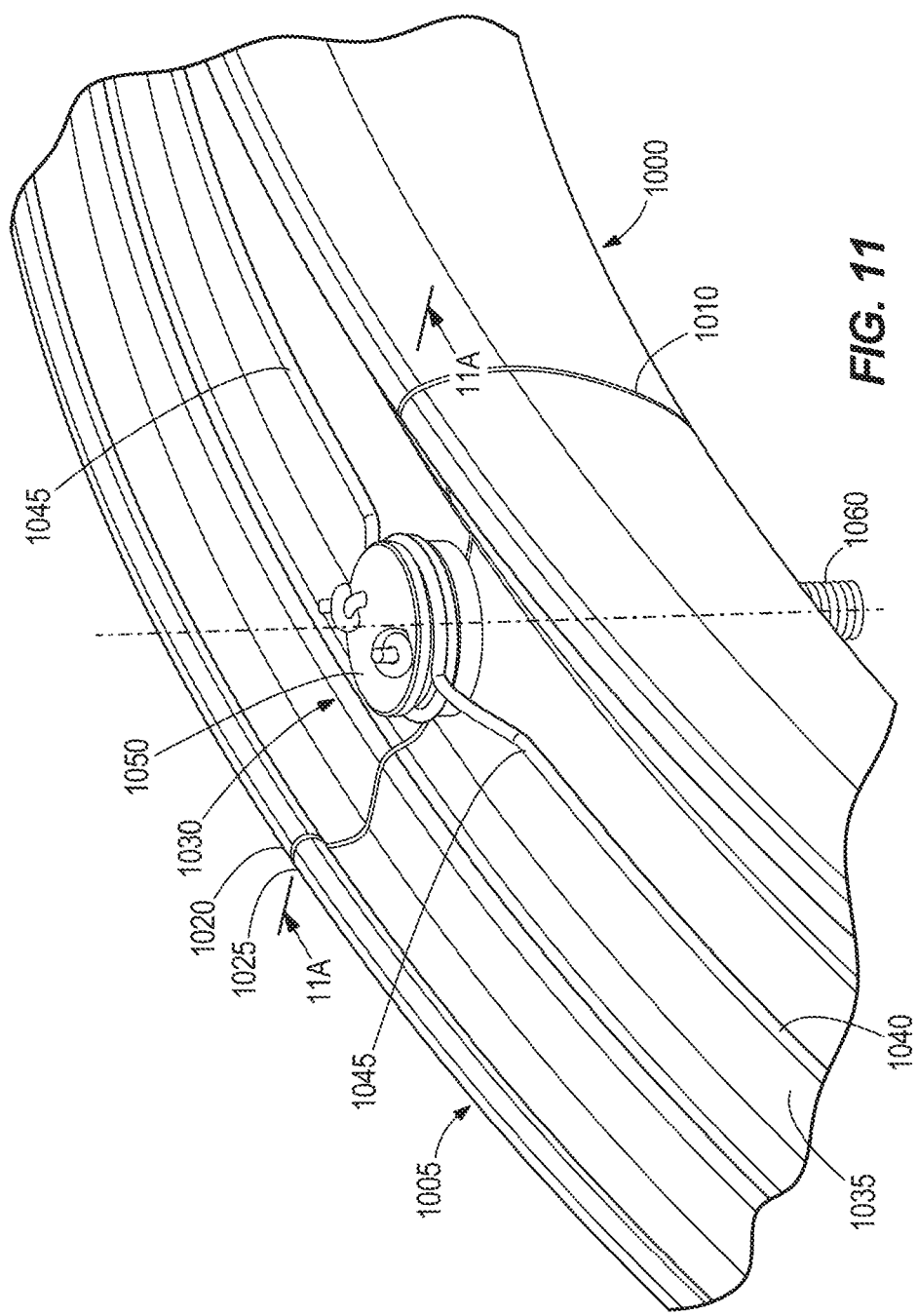

REINFORCED BICYCLE RIM

REFERENCE TO RELATED APPLICATIONS

This is a continuation-in-part of U.S. application Ser. No. 15/837,869, filed Dec. 11, 2017, which is a continuation of U.S. application Ser. No. 15/118,768, filed Aug. 12, 2016, which is a U.S. national stage entry of International Patent App. No. PCT/US2015/015583, filed on Feb. 12, 2015, which claims priority to U.S. Provisional Patent Application No. 62/011,384, filed on Jun. 12, 2014 and U.S. patent application Ser. No. 14/179,119, filed on Feb. 12, 2014, the entire contents of all of which are fully incorporated herein by reference.

BACKGROUND

The present invention relates generally to the field of bicycles and specifically to bicycle wheels.

Bicycle wheels commonly include an axle, a hub rotatable on the axle, spokes extending radially from the hub, a rim supported by the spokes, and a tire. Some wheels also include a pneumatic tube positioned inside the tire to facilitate inflation of the tire, while other wheels are "tubeless." Typically, wheels can be damaged from impact by debris. Conventional wheels also are susceptible to "pinch" flats where the tire and tube are pinched between the rim and another hard object (e.g., rocks).

Existing rims often are primarily formed of metal or composite, but metal rims can easily dent when impacted and add weight to the wheel and composite rims provide poor strength and abrasion resistance and can easily crack. Other rims are formed of reinforced nylon, but these rims are also heavy and too flexible to provide adequate strength and stability. Also, some existing wheels include rims with tall tire-engaging walls to reduce pinch flats. However, these rims are heavy and typically do not adequately protect the rim from damage. Other tires place bumpers on top of the rim walls, but these bumpers are placed on top of the rim sidewalls and are typically soft (having a hardness less than 95 on the Shore A scale, or lower than 45 hardness on the Rockwell R scale) to protect the tire.

SUMMARY

The present invention provides a bicycle rim assembly adapted to be coupled to a hub to create a bicycle wheel. The bicycle rim assembly includes a rim defining a central plane and comprising an annular inner wall and an annular outer wall cooperating with the inner wall to define a cavity. The annular outer wall includes a first bead seat, a second bead seat, and a center well separating the first bead seat and the second bead seat. The bicycle rim assembly further comprises a first annular projection and a second annular projection spaced laterally from each other relative to the central plane and extending substantially radially outwardly from the outer annular wall. Each of the first annular projection and the second annular projection includes a radially outer face and a laterally inner face. The bicycle rim assembly further comprises a right cover and a left cover spaced from the right cover, each of which is preferably coupled to the rim (e.g., to the first and second annular projections, respectively). The right cover covers at least a portion of the laterally inner face of the first annular projection and the first bead seat, and the left cover covers at least a portion of the laterally inner face of the second annular projection and the second bead seat. Preferably, the right cover covers at least a portion of the radially outer face of the first annular projection, and the left cover covers at least a portion of the radially outer face of the second annular projection.

In one embodiment, each of the first annular projection and the second annular projection includes a laterally outer face, wherein at least a portion of the right cover is positioned over the laterally outer face of the first annular projection, and at least a portion of the left cover is positioned over the laterally outer face of the second annular projection. Further, the right cover can covers at least a portion of the radially outer face of the first annular projection, and the left cover can covers at least a portion of the radially outer face of the second annular projection. In addition, at least a portion of the right cover can be positioned in the center well, and at least a portion of the left cover can be positioned in the center well. The right cover and the left cover preferably do not cover the central well.

The right cover can further comprise an inner sidewall and an outer sidewall, the inner sidewall comprising a first radial dimension, the outer sidewall comprising a second radial dimension, and the first radial dimension being greater than the second radial dimension.

One or both of the right cover and left cover can be fiber reinforced, and can be designed to apply elastic forces on the corresponding annular projection to secure the cover to the corresponding projection. For example, the either or both covers can be reinforced with at least one of carbon fiber, aramid fiber, or glass fiber arranged in a polymeric matrix.

The bicycle rim assembly can further include a first piece of tape covering at least part of the right cover and at least part of the central well, and can also include a second piece of tape covering at least part of the left cover and at least part of the central well. The second piece of tape can be positioned to cover at least part of the first piece of tape.

Other aspects of the invention will become apparent by consideration of the detailed description and accompanying drawings.

BRIEF DESCRIPTION OF THE DRAWINGS

FIG. 11 is a perspective view of another exemplary rim and rim insert of a wheel. The tire has been omitted for clarity.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
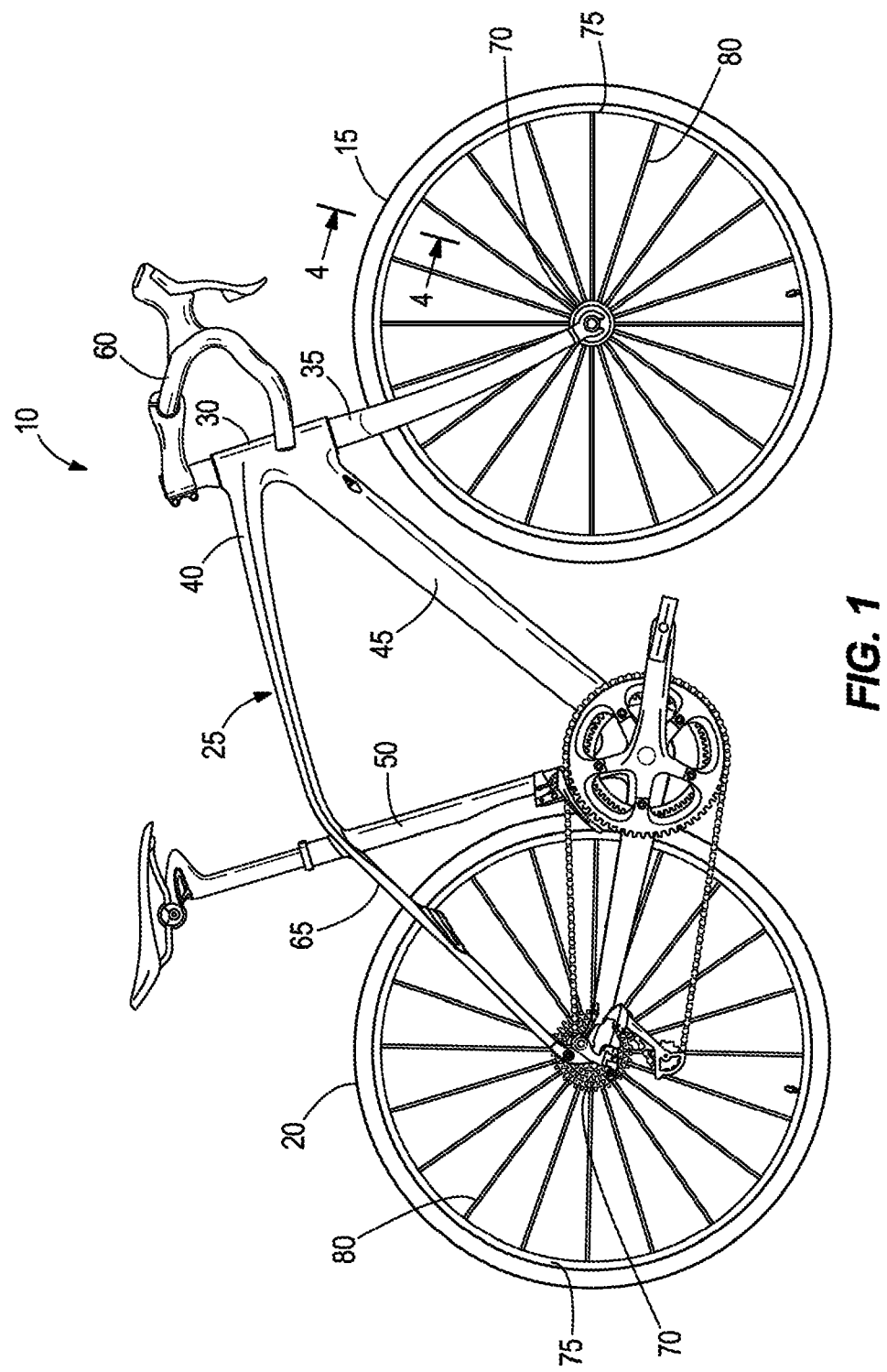
FIG. 1 is a side view of a bicycle including wheels embodying the invention.

FIG. 1 shows a bicycle 10 that includes a front wheel 15, a rear wheel 20, and a frame 25. The frame 25 has a head tube 30, a front fork 35 rotationally supported by the head tube 30, a top tube 40 connected to and extending rearward from the head tube 30, and a down tube 45 connected to the head tube 30 below the top tube 40 and extending generally downward toward a bottom bracket (not shown) of the frame 25. A seat tube 50 extends upward from the bottom bracket and is connected to the top tube 40, and a seat 55 is supported by the seat tube 50. The bicycle 10 also includes a handlebar 60 for turning the front wheel 15 via the fork 35, and the frame 25 has a rear frame triangle 65 that supports the rear wheel 20.

Figure 2:
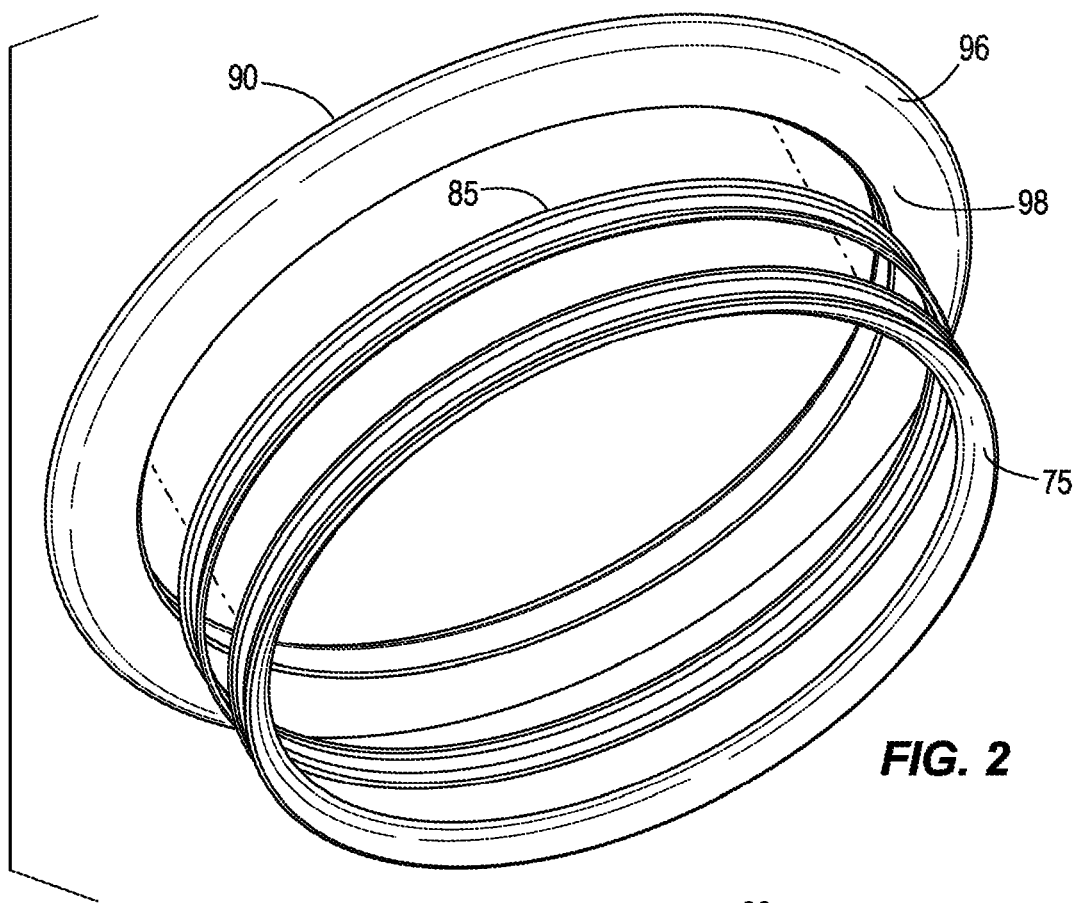
FIG. 2 is an exploded perspective view of a portion of one wheel of FIG. 1 including a rim, a rim insert, and a tire.
Figure 3:
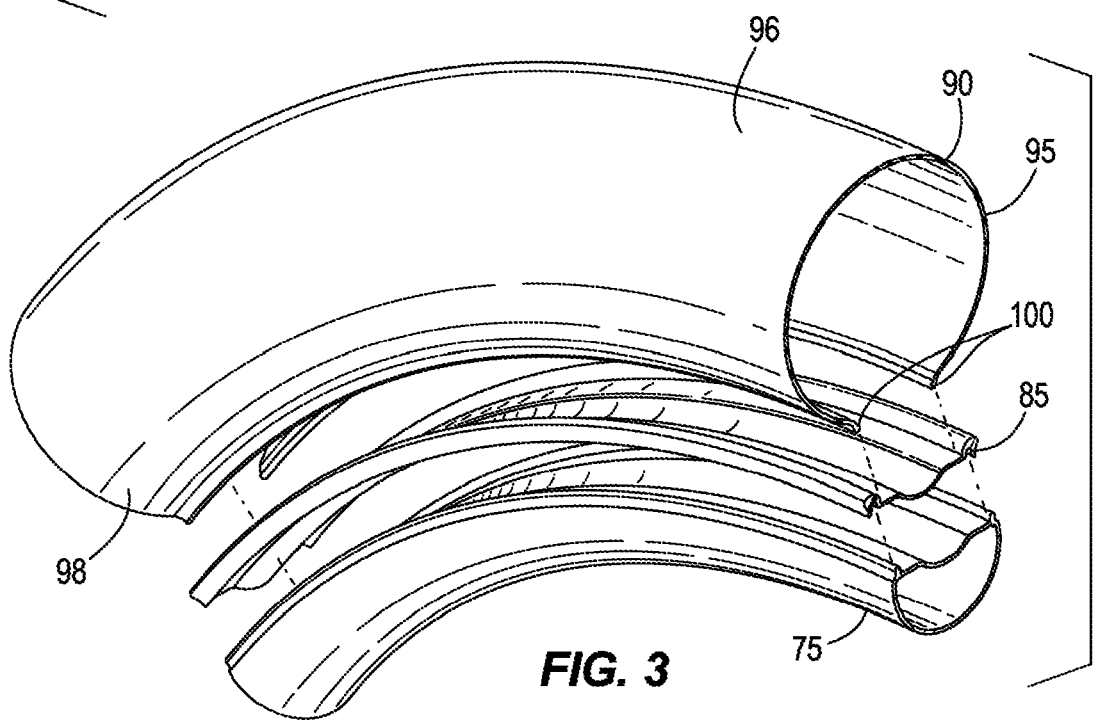
FIG. 3 is a perspective view of a portion of one wheel of FIG. 1 illustrating the rim, the rim insert, and the tire.
Figure 4:
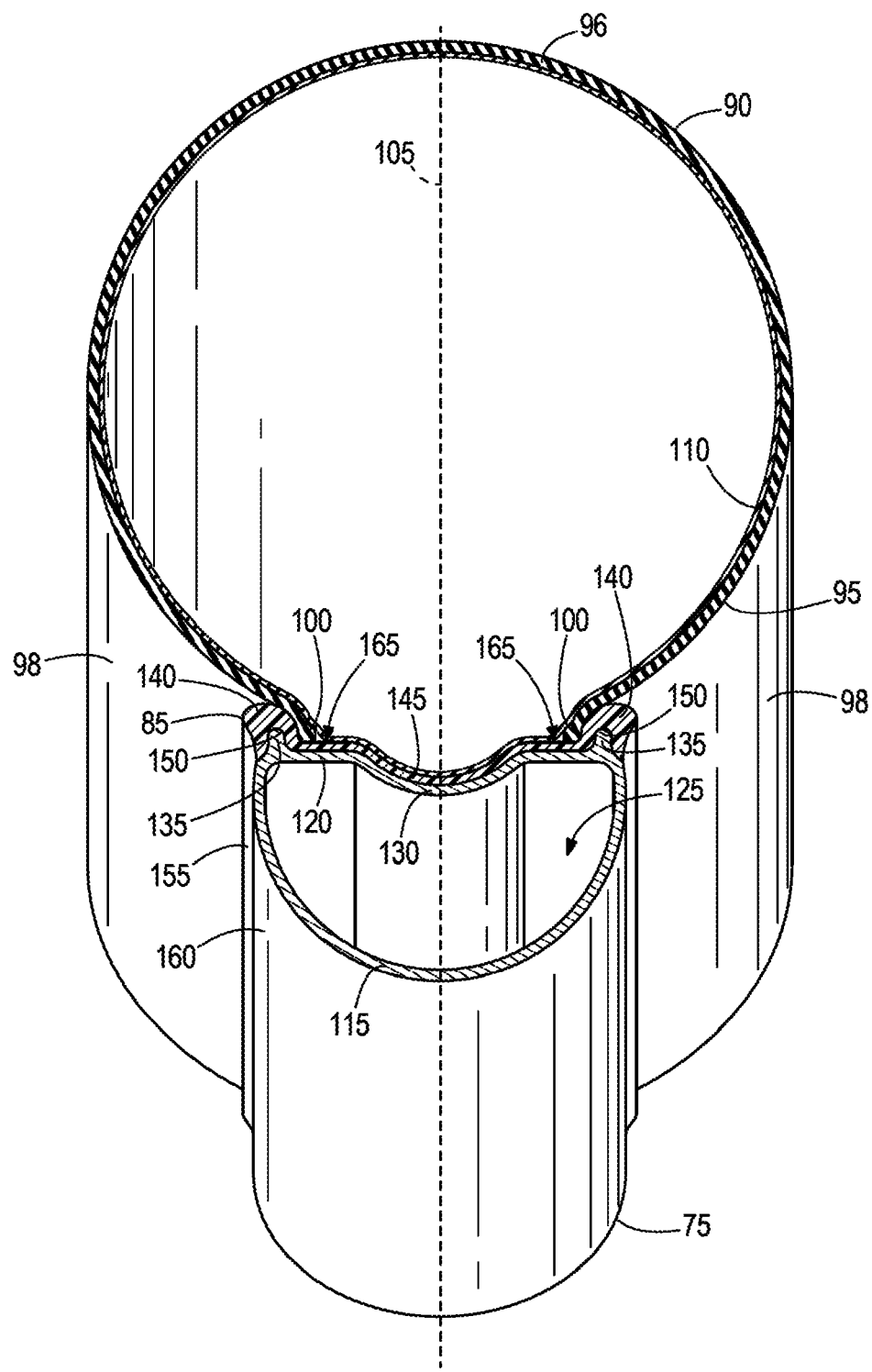
FIG. 4 is a section view of the rim, the rim insert, and the tire of the front wheel of FIG. 1 taken along line 4-4.

Referring to FIGS. 1-4, each illustrated wheel 15, 20 includes a hub 70, a rim 75 supported by the hub 70 via spokes 80 (or other wheel reinforcement members), a rim insert or cover 85 (referred to as a "cover" for purposes of description), and a tire 90 that is engaged with the rim 75 via the cover 85. The tire 90 is defined by a tubular casing 95 having a tread portion 96 and sidewalls 98 that terminate at tire beads 100 disposed on edges of the casing 95. Each wheel 15, 20 has a central plane 105 intersecting the hub 70 and the rim 75 such that the wheel 15, 20 is symmetrical about the central plane 105. Although FIG. 4 illustrates a pneumatic tube 110 ("inner-tube") positioned inside the tire 90 to facilitate inflation of the tire 90, in some embodiments, the tire 90 can instead be tube-less.

The rim 75 is annular and can be formed of metallic, composite, or other appropriate material. With reference to FIGS. 2-4, the illustrated rim 75 has an annular inner wall 115 and an annular outer wall 120 that is joined with the inner wall 115 such that the rim 75 is hollow and defines a cavity 125. The spokes 80 or other wheel reinforcement members can be attached to the rim 75 within the cavity 125, as is known in the art.

The outer wall 120 defines a platform to which the cover 85 is attached. The outer wall 120 can have a drop-center 130 disposed on the central plane 105. As shown, the rim 75 has a first annular feature and the cover 85 has a second annular feature that is complementary to the first annular feature so that the cover 85 can be secured to the rim 75. For example, FIGS. 3 and 4 illustrate that the first annular feature is defined by projections 135 that are spaced laterally relative to the central plane 105 and that extend outward from the outer wall 120 adjacent the lateral sides of the rim 75. The illustrated projections 135 define annular ridges over which the cover 85 is attached.

The cover 85 is shaped to wrap around the rim 75 and to conform to the shape of the outer wall 120. With continued reference to FIGS. 3 and 4, the cover 85 has annular sidewalls 140 disposed on lateral sides of the cover 85, and an annular ring portion 145 that interconnects or bridges the sidewalls 140 such that the cover 85 is continuous between the sidewalls 140. Each illustrated sidewall has the second annular feature defined by an annular groove or channel 150 (referred to as a "channel" for purposes of description) that is accessible from a radially-innermost side of the cover 85 and that receives a corresponding projection 135. While the illustrated projections 135 have a substantially constant width or thickness and the channels 150 have a corresponding width or thickness, the projections 135 (and corresponding channels 150) can have bulbous or polygonal cross-sectional shapes, or other features, to mechanically secure the cover 85 on the rim 75. Adhesive can also be used to secure the cover 85 to the rim 75.

The cover 85 is oriented on the rim 75 such that the sidewalls 140 are located adjacent lateral sides of the rim 75. In this position, an exterior surface 155 of the sidewalls 140 is shaped to smoothly transition to an exterior or exposed surface 160 of the inner wall 115 of the rim 75 (e.g., to reduce drag and improve aerodynamic performance). As illustrated, the sidewalls 140 are engageable by a wall of the tire casing 95 and are curved outward relative to the central plane 105 such that the exterior surface 155 is concave.

As shown in FIG. 4, the ring portion 145 conforms to the shape of the outer wall 120 and defines bead seats 165 adjacent the inner side of the sidewalls 140 to sealingly engage the tire 90. That is, the bead seats 165 defined by the cover 85 are engaged by the tire beads 100 to secure the tire 90 to the rim 75. The sidewalls 140 and the bead seats 165 cooperatively hold the tire 90 in place when the tire 90 is inflated. Although FIG. 4 illustrates that the ring portion 145 has straight and horizontal bead seats 165, it will be appreciated that the rim 75 and the cover 85 can have other bead seat profiles (angular, curved, etc.).

Figure 5:
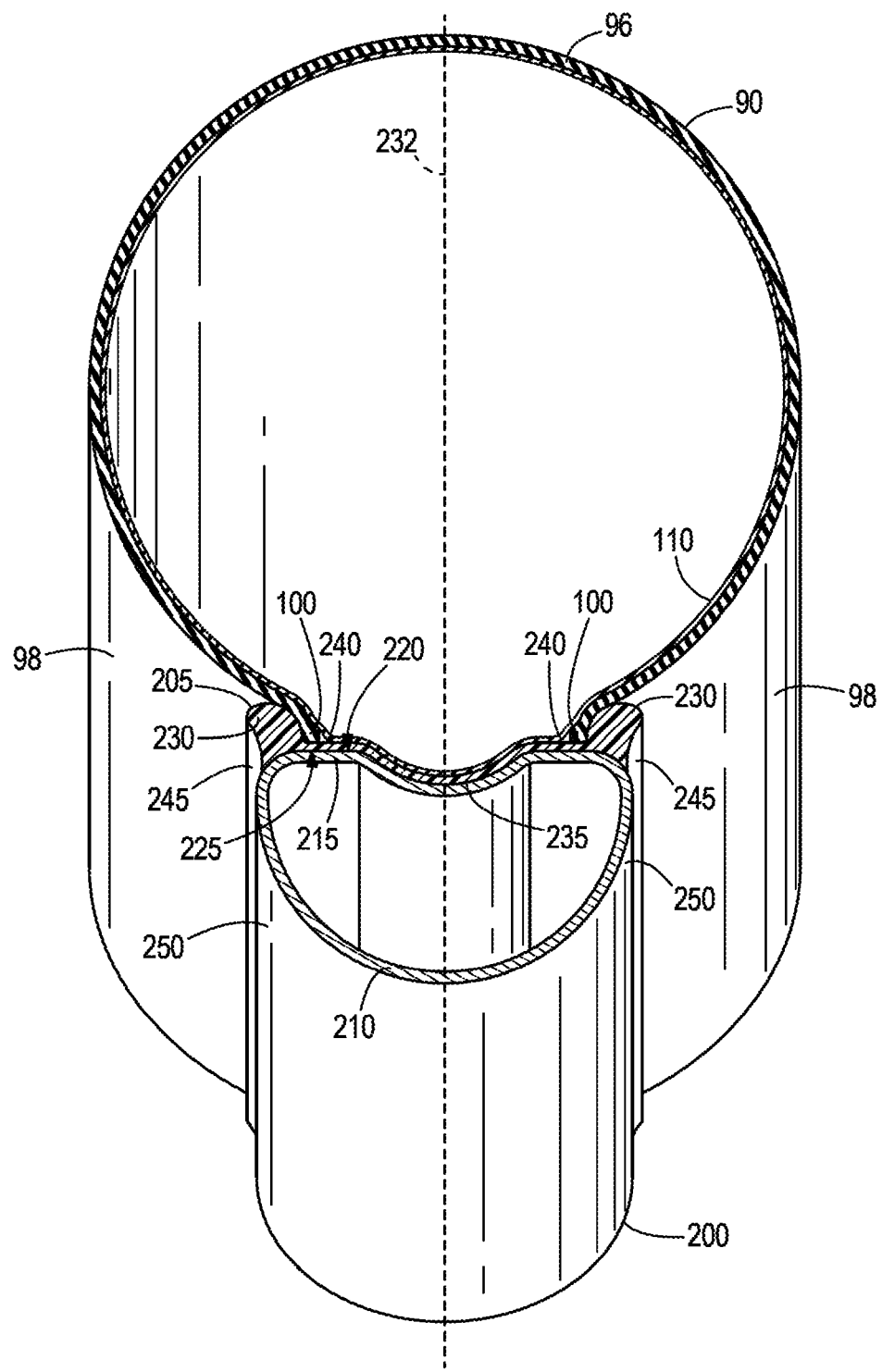
FIG. 5 is a section view of another exemplary rim and rim insert for a wheel.

FIG. 5 illustrates another exemplary rim 200 and cover 205 that can be used with the wheels 15, 20. The illustrated rim 200 has an annular inner wall 210 and an annular outer wall 215. The rim 200 illustrates the first annular feature defined by a first surface 220 of the outer wall 215, and the cover 205 has the second annular feature defined by a second surface 225 of the cover 205 that is complementary to the first annular feature so that the cover can be secured to the rim 200. The first and second surfaces 220, 225 face each other and define a smooth interface between the rim 200 and the cover 205 such that the surfaces 220, 225 are in contact with each other when the cover 205 is installed on the rim 200. The cover 205 is shaped to wrap around the rim 200 and to conform to the shape of the outer wall 215.

With continued reference to FIG. 5, the cover 205 has annular sidewalls 230 disposed on lateral sides of the cover 205 (relative to a central plane 232), and a ring portion 235 that interconnects the sidewalls 230 such that the cover 205 is continuous between the sidewalls 230. The ring portion 235 conforms to the shape of the outer wall 215 and defines bead seats 240 adjacent the inner side of the sidewalls 140 to sealingly engage the tire bead 100.

Except for the lack of projections in the outer wall 215 and the lack of channels in the cover 205, the rim 200 and the cover 205 are the same as the rim 75 and the cover 85 described with regard to FIGS. 2-4. For example, each sidewall 230 has an exterior surface 245 that is shaped to smoothly transition to an exterior surface 250 of the inner wall 210 (e.g., to reduce drag and improve aerodynamic performance). As illustrated, the sidewalls 230 are engageable by the sidewalls 98 of the tire casing 95 and are curved outward relative to the central plane 232 such that the exterior surface 345 is concave.

Figure 6:
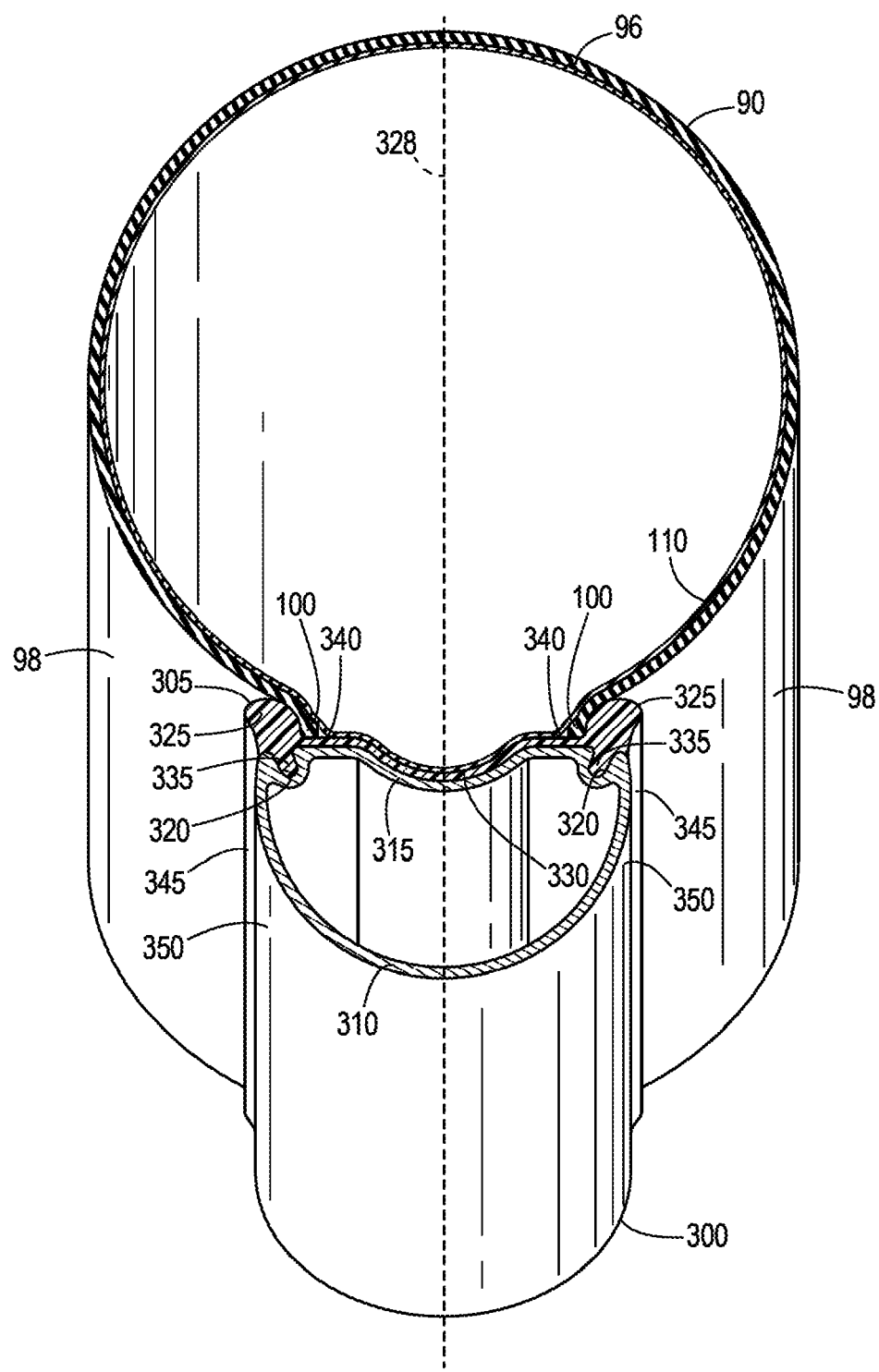
FIG. 6 is a section view of another exemplary rim and rim insert for a wheel.

FIG. 6 illustrates another exemplary rim 300 and cover 305 that can be used with the wheels 15, 20. The illustrated rim 300 includes an annular inner wall 310 and an annular outer wall 315 that has the first annular feature defined by channels 320 disposed in the rim 300 (i.e. adjacent or at the corner defined by the juncture between the inner and outer walls 310, 315).

The cover 305 includes annular sidewalls 325 disposed on lateral sides of the cover 305 (relative to a central plane 328), and a ring portion 330 that interconnects the sidewalls 325 such that the cover 305 is continuous between the sidewalls 325. The sidewalls 325 have the second annular feature that is defined by projections 335. The projections 335 extend from the radially-inner side of the cover 305 and are engaged with the channels 320 to attach the cover 305 to the rim 300. As will be appreciated, the first and second annular features defined by the rim 300 and the cover 305 illustrated in FIG. 6 are the reverse of the first and second annular features defined by the rim 75 and the cover 85 illustrated in FIGS. 3 and 4.

The ring portion 330 conforms to the shape of the outer wall 315 and defines bead seats 340 adjacent the inner side of the sidewalls 325 to sealingly engage the tire bead 100. In addition, each sidewall 325 has an exterior surface 345 that is shaped to smoothly transition to an exterior surface 350 of the inner wall 310 (e.g., to reduce drag and improve aerodynamic performance). As illustrated, the sidewalls 325 are engageable by the sidewalls 98 of the tire casing 95 and are curved outward relative to the central plane 328 such that the exterior surface 345 is concave.

Figure 7:
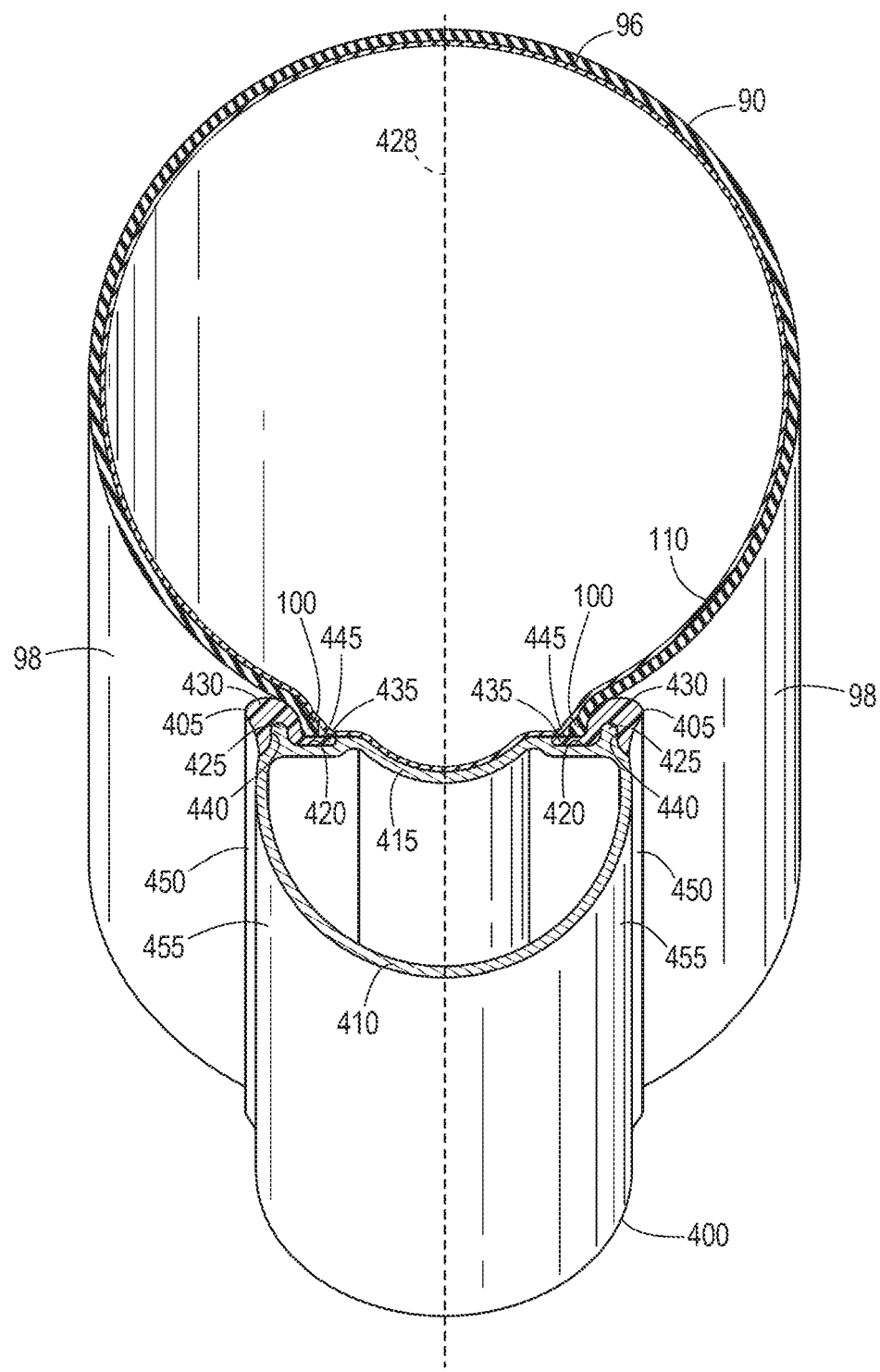
FIG. 7 is a section view of another exemplary rim and rim insert for a wheel.

FIG. 7 illustrates another exemplary rim 400 and two covers 405 that can be used with the wheels 15, 20. With reference to FIG. 7, the illustrated rim 400 includes inner and outer walls 410, 415 and is similar to the rim 75 described relative to FIGS. 2-4, except that the rim 400 also has a stepped portion or recess 420 (referred to as a "recess 420" for purposes of description) disposed between the central plane 105 and the first annular feature. As illustrated in FIG. 7, the first annular feature is defined by projections 425 extending from the outer wall 415 adjacent the lateral sides of the rim 400 (relative to a central plane 428).

The covers 405 define a two-piece cover assembly (i.e. a first cover 405 and a second cover 405) and are separately engaged with laterally opposed sides of the rim 400. Each cover 405 has a sidewall 430 and an annular ring portion 435. The sidewalls 430 have the second annular feature that is defined by channels 440 disposed in the radially-inner side of the cover 405. The channels 440 are engaged with the projections 425 to attach the cover to the rim 400. As will be appreciated, the first and second annular features defined by the rim 400 and the covers 405 illustrated in FIG. 7 are the same as the first and second annular features defined by the rim 75 and the cover 85 illustrated in FIGS. 3 and 4.

The ring portion 435 extends from the projection 425 laterally toward but stops short of the central plane 428 to define a bead seat 445 that is engageable by the tire bead 100. The ring portion 435 is positioned in the recess 420 such that an outer surface of the ring portion 435 blends with the outer surface of the outer wall 415 (i.e. the thickness of the ring portion 435 is the same or approximately the same as the depth of the recess 420). The ring portion 435 also increases the surface area of each cover so that the cover 405 can be more securely attached to and oriented on the rim 400. Although not shown, a rim strip can be placed over the area between the bead seats 445. Alternatively, this area can remain exposed (i.e. the wheel 15, 20 can be provided without a rim strip). The two-piece construction of the cover assembly decreases the amount of material needed to provide the covers 405, which reduces the total weight of the covers 405 relative to the weight of the one-piece covers described with regard to FIGS. 3-6.

Each sidewall 430 has an exterior surface 450 that is shaped to smoothly transition to an exterior surface 455 of the inner wall 410 (e.g., to reduce drag and improve aerodynamic performance). As illustrated, the sidewalls 430 are engageable by the sidewalls 98 of the tire casing 95 and are curved outward relative to the central plane 428 such that the exterior surface 450 is concave.

Figure 8:
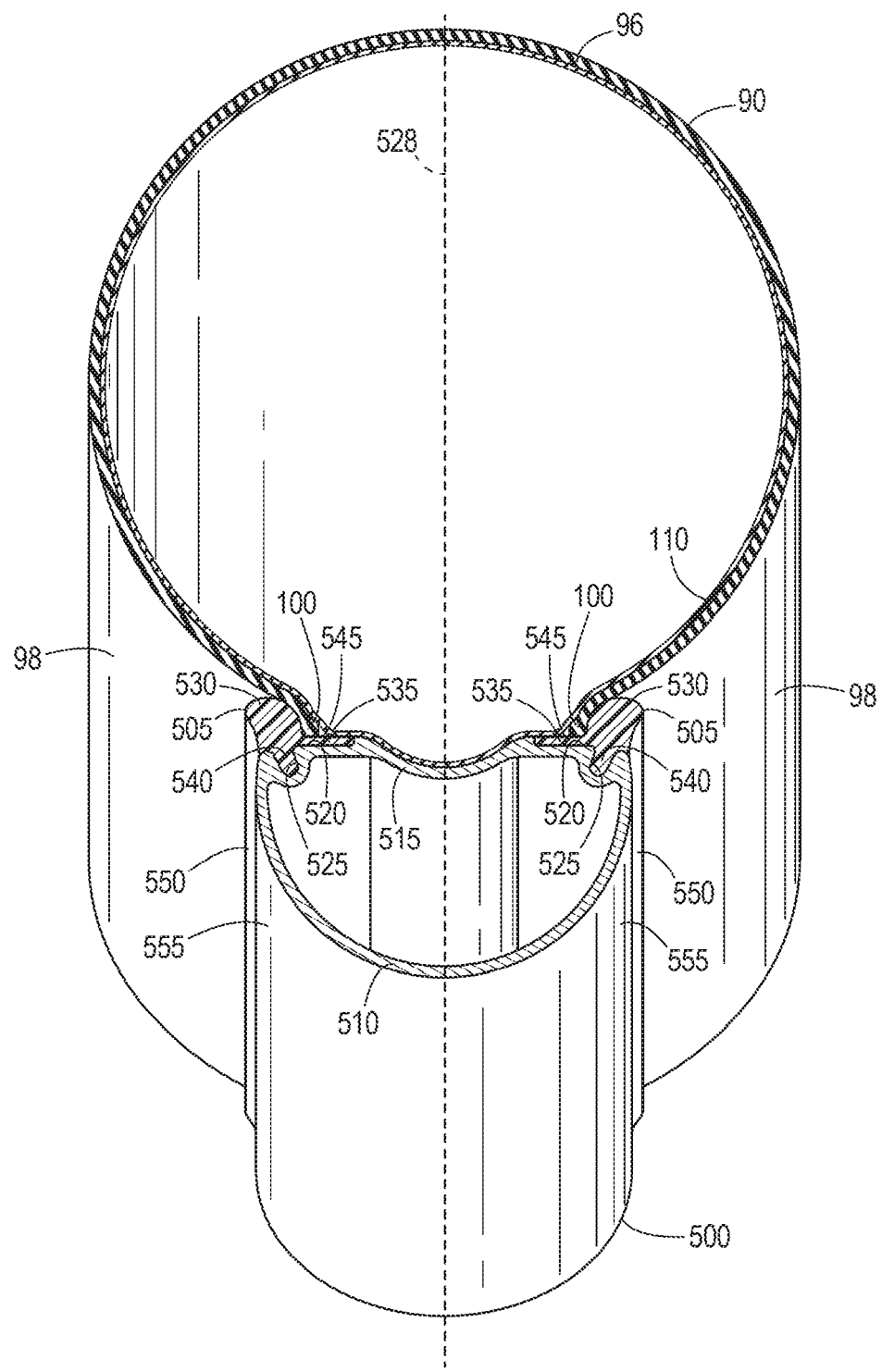
FIG. 8 is a section view of another exemplary rim and rim insert for a wheel.

FIG. 8 illustrates another exemplary rim 500 and two laterally-spaced covers 505 that can be used with the wheels 15, 20. With reference to FIG. 8, the illustrated rim 500 has inner and outer walls 510, 515. The rim 500 is similar to the rim 300 described relative to FIG. 6, except that the rim 500 also has a stepped portion or recess 520 (referred to as a "recess 520" for purposes of description). As illustrated in FIG. 7, the first annular feature is defined by channels 525 disposed in the outer wall 515 adjacent the lateral sides of the rim 500 (relative to a central plane 528).

The covers 505 define a two-piece cover assembly (i.e. a first cover 505 and a second cover 505) and are separately engaged with laterally opposed sides of the rim 500. Each cover 505 has a sidewall 530 and an annular ring portion 535. The sidewalls 530 have the second annular feature that is defined by annular projections 540. The projections 540 extend from the radially-inner side of the cover 505 and are engaged with the channels 525 to attach the cover 505 to the rim 500. As will be appreciated, the first and second annular features defined by the rim 500 and the cover 505 illustrated in FIG. 8 are the same as the features described with regard to FIG. 6, and the reverse of the features described with regard to FIG. 7. The ring portion 535 defines bead seats 545 and is the same as the ring portion 435 described with regard to FIG. 7. As such, the ring portion 535 will not be discussed in greater detail.

Each sidewall 530 has an exterior surface 550 that is shaped to smoothly transition to an exterior surface 555 of the inner wall 510 (e.g., to reduce drag and improve aerodynamic performance). As illustrated, the sidewalls 530 are engageable by the sidewalls 98 of the tire casing 95 and are curved outward relative to the central plane 528 such that the exterior surface 550 is concave.

Figure 9:
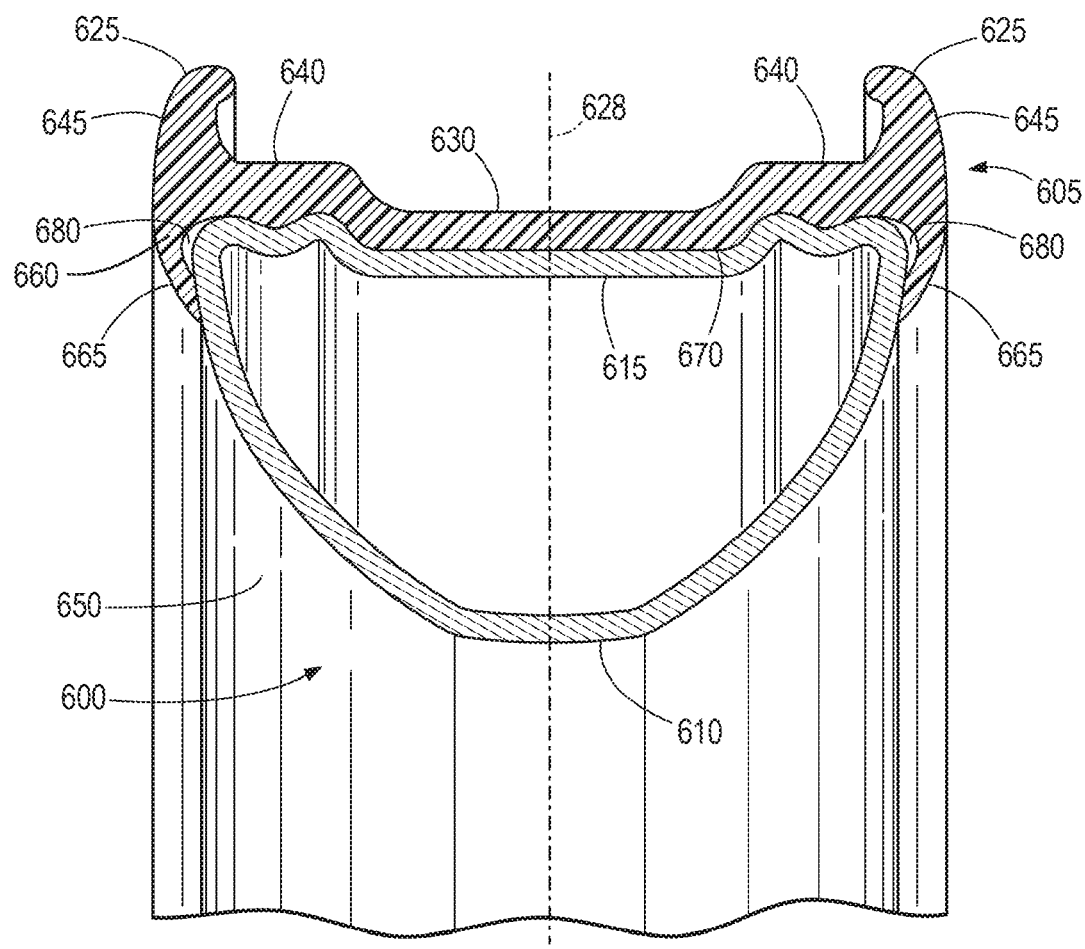
FIG. 9 is a section view of another exemplary rim and rim insert for a wheel.

FIG. 9 illustrates another exemplary rim 600 and cover 605 that can be used with the wheels 15, 20. The illustrated rim 600 includes an annular inner wall 610 and an annular outer wall 615. The rim 600 and the cover 605 can be similar to the rim and cover described above relative to FIGS. 2-6, except that the cover 605 can have a wipe seal 665 and can define a void 680.

The cover 605 can include annular sidewalls 625 disposed on lateral sides of the cover 605 (relative to the central plane 628), and a ring portion 630 that interconnects the sidewalls 625 such that the cover 605 is continuous between the sidewalls 625. The ring portion 630 can conform to the shape of the outer wall 615 and can define bead seats 640 adjacent the inner side of the sidewalls 625 to sealingly engage the tire bead 100. In addition, each sidewall 625 can have an exterior surface 645, and the wipe seal 665 which projects downwardly from a bottom surface 670 of the ring portion 630. The wipe seal 665 can be contiguous with the exterior surface 645 of the sidewall and shaped to smoothly transition to an exterior surface 650 of the inner wall 610.

The cover 605 and the rim 600 can define a void 680 configured to allow the cover 605 to move about a hinge 660. Upon impact, the cover 605 may flex about the hinge 660 and allow the sidewalls 625 to flex and absorb a greater amount of energy and provide greater protection against impact punctures than in conventional rims. As described above, the wipe seal 665 smoothly transitions to the exterior surface 650 of the inner wall 610 thereby preventing dirt and debris from entering the void 680 and adversely affecting the energy absorbing capabilities of the cover 605.

Figure 10:
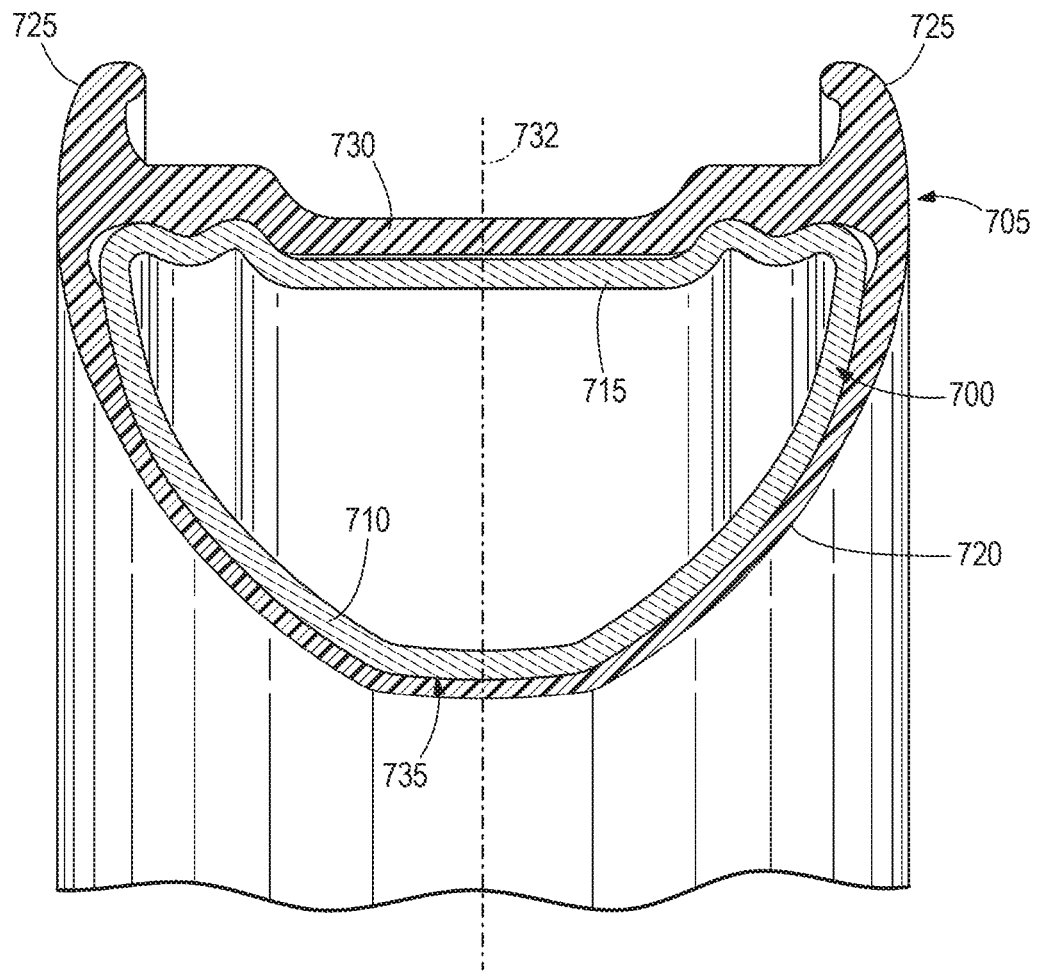
FIG. 10 is a section view of another exemplary rim and rim insert for a wheel.

FIG. 10 illustrates an exemplary rim 700 that is surrounded by a cover 705. The rim 700 and the cover 705 can be configured such that the cover 705 completely surrounds and receives the rim 700. The rim 700 has inner and outer annular walls 710, 715, which can be similar to the annular walls described with regard to FIGS. 3-9. The cover 705 can include an inner wall 720, annular sidewalls 725 that are disposed on lateral sides of the cover 705 (relative to a central plane 732), and a ring portion 730 that interconnects the sidewalls 725 such that the cover 705 is continuous between the annular inner wall 720, the sidewalls 725, and the ring portion 730. That is, the inner wall 720, the sidewalls 725, and the ring portion 730 can cooperatively define a cavity 735 that is sized to receive and closely conform to the inner and outer annular walls 710, 715 of the rim 700.

The covers 85, 205, 305, 405, 505, 605, 705 described with regard to FIGS. 4-10 can support the load generated by tire pressure when the tire 90 is inflated. To provide adequate support for this load, the cover can be formed of a material that has a sufficient hardness to sealingly engage the tire 90. For example, the cover can be manufactured from a material that has a hardness of at least 50 on the Rockwell R scale (approximately a hardness of 60 on the Shore D scale). In some embodiments, the hardness of the cover is at least 60 Rockwell R (approximately 70 Shore D). For example, the cover can be manufactured from Ultra High Molecular Weight Polyethylene ("UHMW") that has a hardness of approximately 70 Rockwell R (approximately 80 Shore D). Other plastic or non-plastic material (e.g., Nylon, glass-filled Nylon, Acrylonitrile Butadiene Styrene ("ABS"), etc.) can be substituted for the UHMW material as long as the hardness is sufficient to support the tire pressure load generated by tire inflation, while still achieving a satisfactory seal (when used with a tubeless tire).

The covers 85, 205, 305, 405, 505, 605, 705 described with regard to FIGS. 4-10 can be assembled onto the rims 75, 200, 300, 400, 500, 600, 700, respectively, by co-molding or co-forming the cover and the rim, adhering the cover to the rim, or mechanically holding the cover in place on the rim (e.g., via a resilient connection). For example, the covers 85, 205, 305, 405, 505, 605, 705 can be mechanically connected to the rim 75, 200, 300, 400, 500 600, 700 by a rivet or a threaded connector system.

Figure 11A:
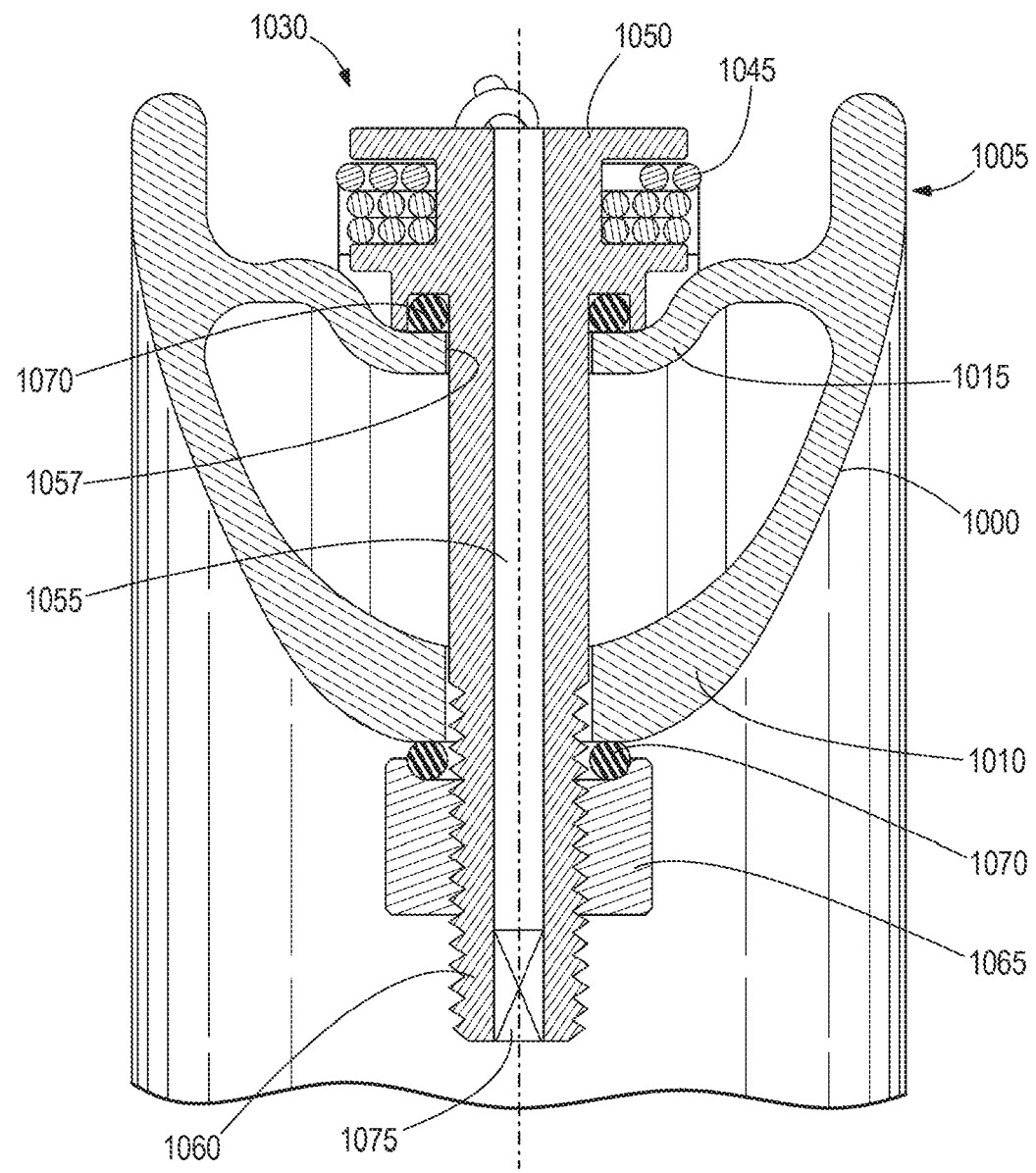
FIG. 11A is a sectional view of the rim and rim insert of the wheel illustrated in FIG. 11 taken along line 11-11.
Figure 12:
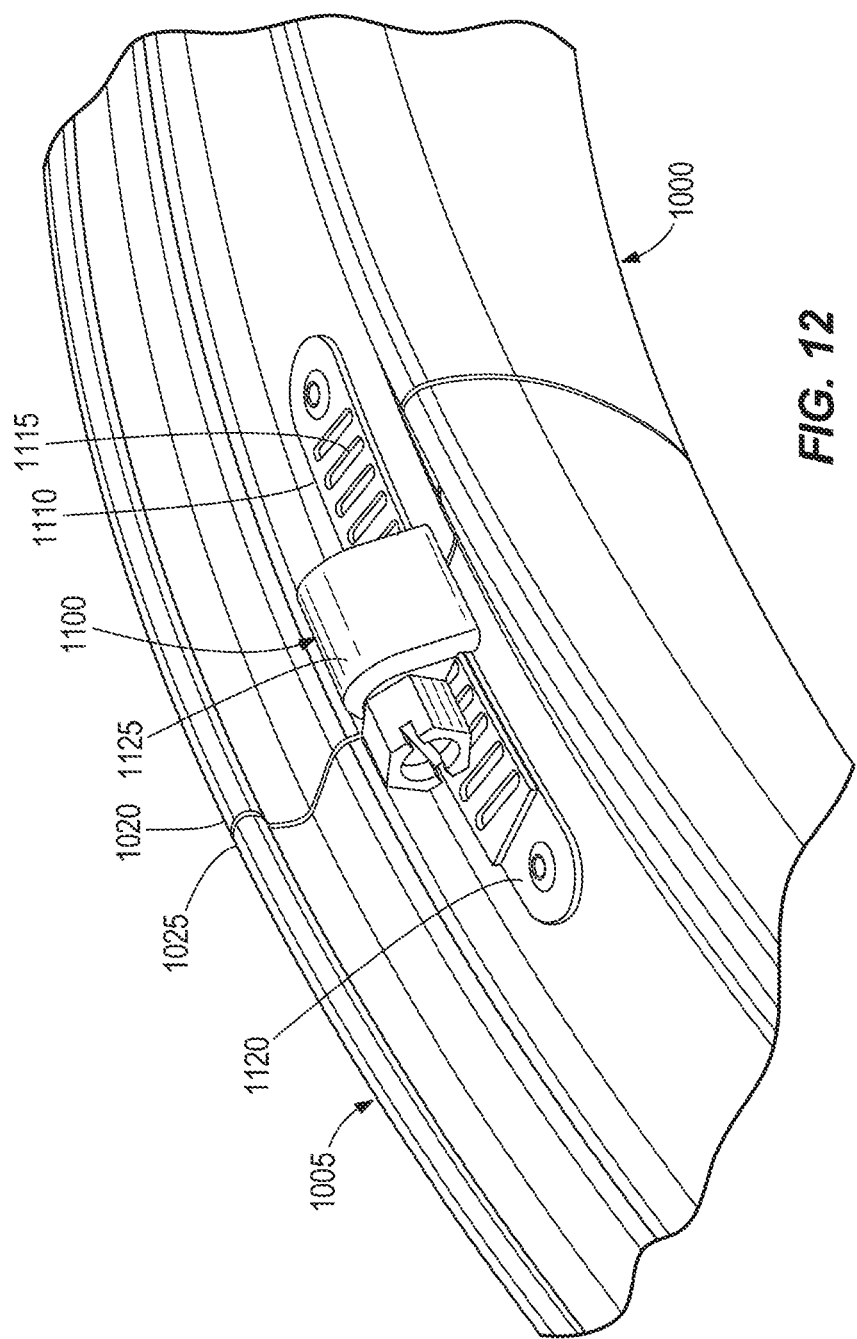
FIG. 12 is a perspective view of another exemplary rim and rim insert of a wheel. The tire has been omitted for clarity.

FIGS. 11-12 illustrate two exemplary connectors that attach another cover 1005 to a rim 1000 that has an inner annular wall 1010 and an outer annular wall 1015. The cover 1005 can include first and second free ends 1020, 1025. The cover 1005 can be circumferentially secured to inner and outer annular walls 1010, 1015 by drawing or pulling the first and second free ends 1020 and 1025 toward one another with an adjustable connector.

With reference to FIGS. 11 and 11A, the illustrated connector can include a winch and cable system 1030 including a cable 1040 that is positioned in a ring portion 1035 of the cover 1005. The cable can have free ends 1045 secured to a tightening mechanism 1050 (e.g., a winch) that is configured to selectively move the cable free ends 1045 toward each other. The illustrated cable free ends 1045 can wrap around the winch 1050. The winch 1050 can be secured to an actuator 1055 that is mounted for rotation in an opening 1057 of the rim 1000. An exposed portion 1060 of the actuator 1055 can extend through the rim 1000, can be accessible from outside the rim 1000, and can be secured to the rim 100 by a nut 1065. That is, the exposed portion 1060 of the actuator 1055 can be engaged from outside the inner annular wall 1010 of the rim 1000. Two seals 1070 between the actuator 1055 and the rim 1000 can inhibit passage of gas between the actuator 1055 and the rim 1000. The illustrated actuator 1055 is a tubular member and includes a valve mechanism 1075 that can control passage of gas into and out of the interior volume of the tire.

With reference to FIG. 12, the adjustable connector includes a worm drive clamp mechanism 1100. The worm drive clamp mechanism 1100 can include a first band 1110 that is connected to the cover 1005 adjacent the first free end 1020, and a second band 1120 that is connected to the cover 1005 adjacent the second free end 1025. The first band 1110 can define a female portion 1115 of a threaded system, and the second band 1120 can contain a captive male threaded member 1125. When the male threaded member 1125 is turned, it can act as a worm drive that engages the female threaded portion 1115 of the first member and moves the first and second free ends of the cover 1020, 1025 toward or away from one another to circumferentially tighten or loosen the cover 1005 relative to the annular outer wall 1015.

In many embodiments, the covers described herein can be removably coupled to the rims described herein or the covers can be permanently attached. For example, the covers can be molded into or molded onto the rims (e.g., using a mold release) in a manner such that the covers can be removably installed on the rims. In other embodiments, the covers can elastically deform to tightly fit onto the rims. For example, in some embodiments, any of the covers described herein can be heated or otherwise warmed up using a heat source prior to placing the covers on the rims such that the covers can be resiliently deformed (e.g., stretched) over or onto the rims. In some embodiments, the covers may be re-used after removal.

In these or other embodiments, the rims described herein can be shaped to have one or more positive or negative engagement features that are complementary to features on the covers to attach the covers to the rims. Also, the thickness of the rims can be reduced to accommodate the thickness of the covers.

In these or other embodiments, each cover can define a compliant layer between the rim and the tire 90 that can buffer impact and spread the impact energy over a greater area. Because the cover can be non-metallic and not quite as hard as the metallic or composite rim, the cover also can protect the rim if the bicycle 10 is ridden with a flat tire. The cover also can protect the tire 90 wall by supporting the lower part of the casing 95 to resist "pinch" flats. In this manner, the cover can define the tire-engaging portion of the wheel 15, 20 as well as a "bumper" that dampens impact and reduces the likelihood of "pinch" flats. Stated another way, the metallic or composite rim can provide the strength and stiffness to the wheel 15, 20 and the non-metallic cover can provide the toughness needed at the tire interface to secure the tire 90 to the rim while minimizing damage to the tire 90 and the rim.

Figure 13:
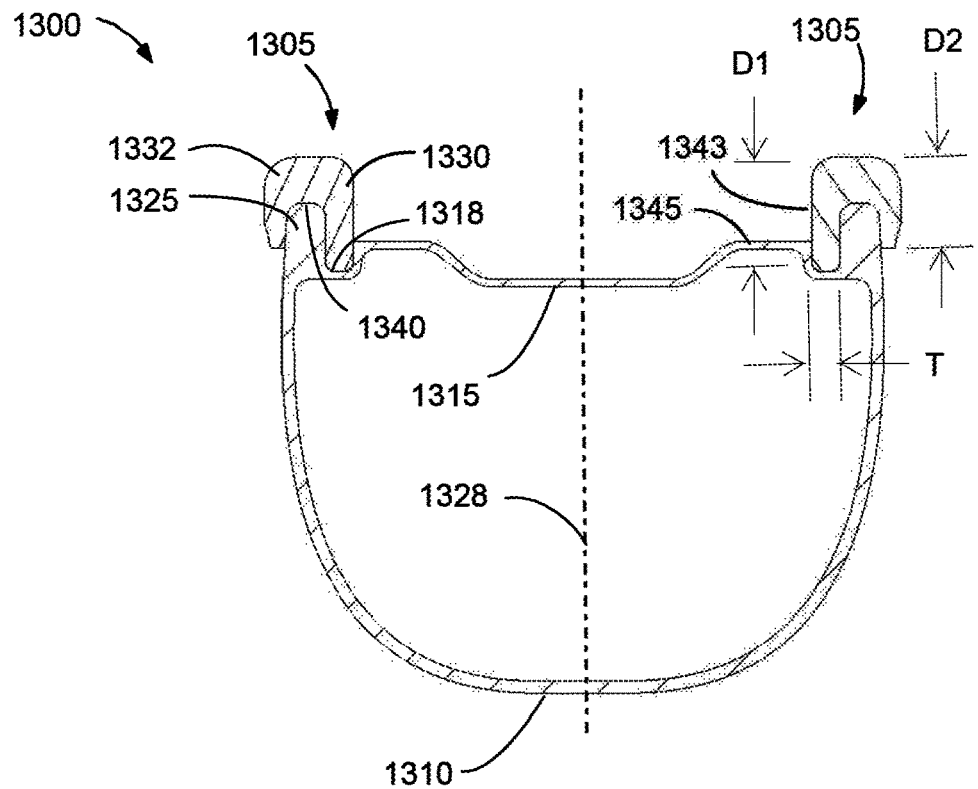
FIG. 13 is a section view of another exemplary rim and rim insert for a wheel.

FIG. 13 illustrates a rim 1300 provided with two covers 1305 that can be used with wheels rims. For example, in many embodiments, the rim 1300 can be similar to the rim 400 (FIG. 7) and/or rim 500 (FIG. 8), and/or the covers 1305 can be similar to the covers 405 (FIG. 7) and/or 505 (FIG. 8).

The illustrated rim 1300 can include inner and outer walls 1310, 1315. As illustrated in FIG. 13, the first annular feature can be defined by projections 1325 extending from the outer wall 1315 adjacent the lateral sides of the rim 1300 (relative to a central plane 1328). Each side of the outer wall 1315 can include a groove 1318 dimensioned to receive a portion of a corresponding cover 1305, as described below in more detail.

The covers 1305 are separately engaged with laterally opposed sides of the rim 1300. Each cover 1305 can have an inner sidewall 1330 and an outer sidewall 1332 that are separate by the second annular feature in the form of a channel 1340 disposed in the radially-inner side of the cover 1305. Each channel 1340 can receive and be engaged with a corresponding projection 1325 to attach the cover to the rim 1300. Further, each inner sidewall 1330 can be inserted into and can engage with a corresponding groove 1318 in the outer wall 1315 of the rim 1300. In this regard, it is noted that each inner sidewall 1330 of the cover 1305 can have a substantially constant lateral wall thickness T. Further, it is noted that each inner sidewall 1330 can form substantially the entire inner surface 1343 of the rim sidewall that engages the tire bead. Further still, the covers 1305 may not form the bead seat 1345. With further reference to FIG. 13, it is noted that the inner sidewalls 1330 can extend radially inward a distance D1 that is further than the corresponding distance D2 of the outer sidewalls 1332. In these embodiments, the result can be that the inner sidewalls 1330 are radially taller than the outer sidewalls 1332. In many embodiments, an outer surface of outer sidewalls 1332 can be rounded, such as, for example, away from inner sidewalls 1330, but in other embodiments, at least part of the outer surface of outer sidewalls 1332 can be flat.

Figure 14:
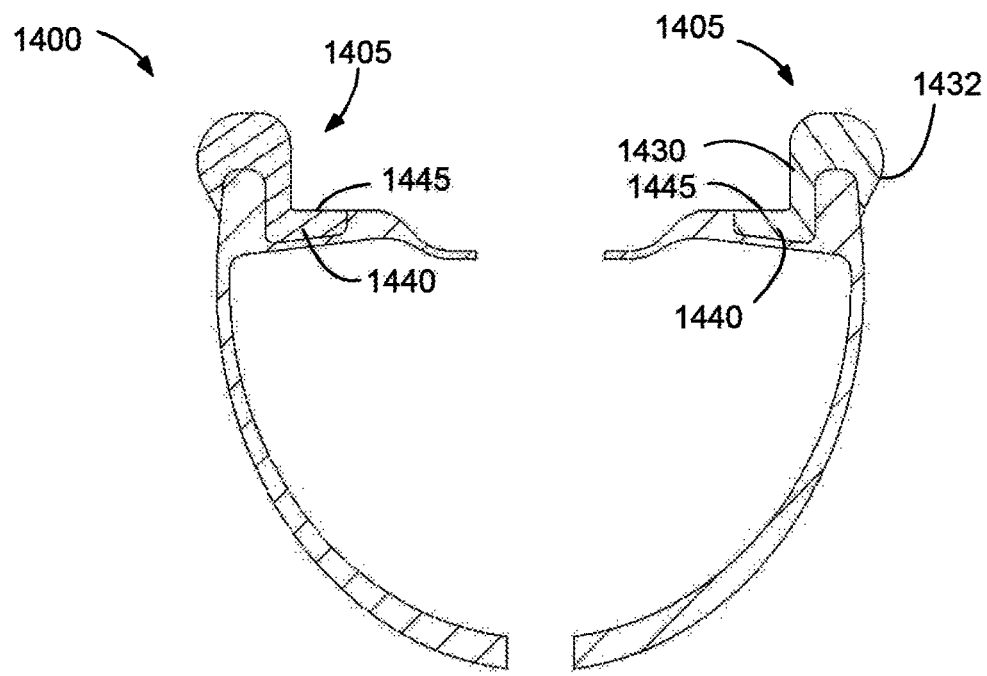
FIG. 14 is a section view of another exemplary rim and rim insert for a wheel (shown at a spoke hole of the rim).

FIG. 14 illustrates a rim 1400 provided with two covers 1405 that can be used with wheels rims. For example, in many embodiments, the rim 1400 can be similar to the rim 400 (FIG. 7), rim 500 (FIG. 8), and/or the rim 1300 (FIG. 13); and/or the covers 1405 can be similar to the covers 405 (FIG. 7), the covers 505 (FIG. 8), and/or the covers 1305 (FIG. 13).

In many embodiments, similar to the covers 1305 (FIG. 13), the covers 1405 can have inner sidewalls 1430 that extend radially inward further than the corresponding outer sidewalls 1432. The result is that the inner sidewalls 1430 can be radially taller than the outer sidewalls 1432. In addition, in these embodiments, each cover 1405 can include a seat portion 1440 that can define at least a portion of the corresponding bead seat 1445. In many embodiments, an outer surface of outer sidewalls 1432 can be rounded, such as, for example, away from inner sidewalls 1430, but in other embodiments, at least part of the outer surface of outer sidewalls 1432 can be flat.

Figure 15:
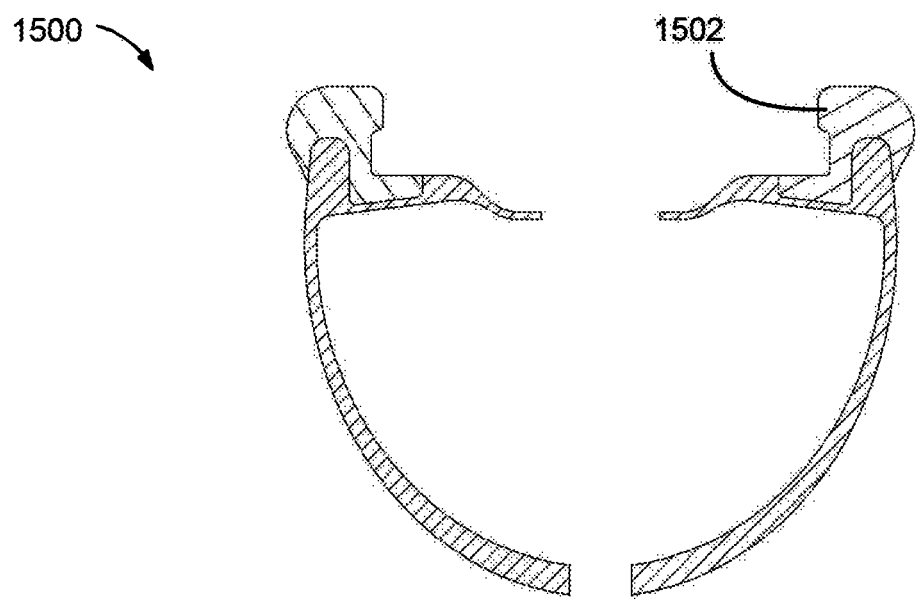
FIG. 15 is a section view of another exemplary rim and rim insert for a wheel (shown at a spoke hole of the rim).
Figure 16:
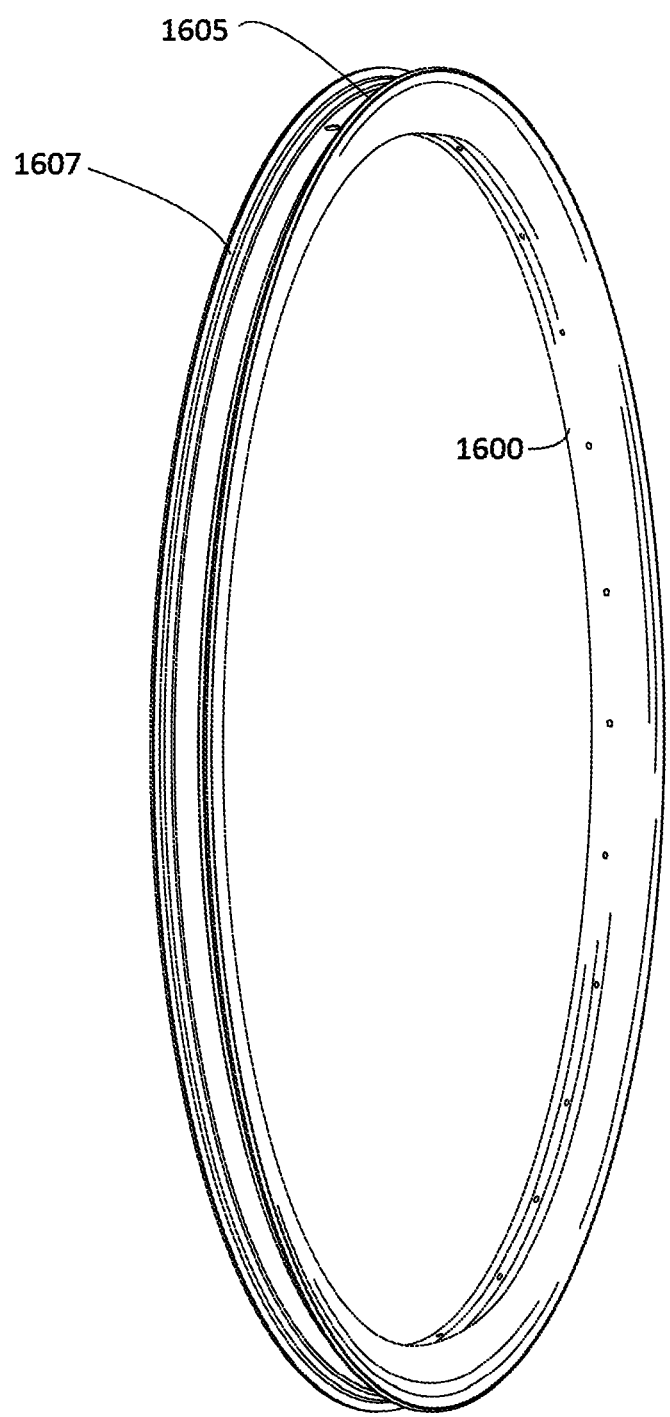
FIG. 16 is a perspective view of a rim assembly including a rim, two covers and two pieces of tape.
Figure 17:
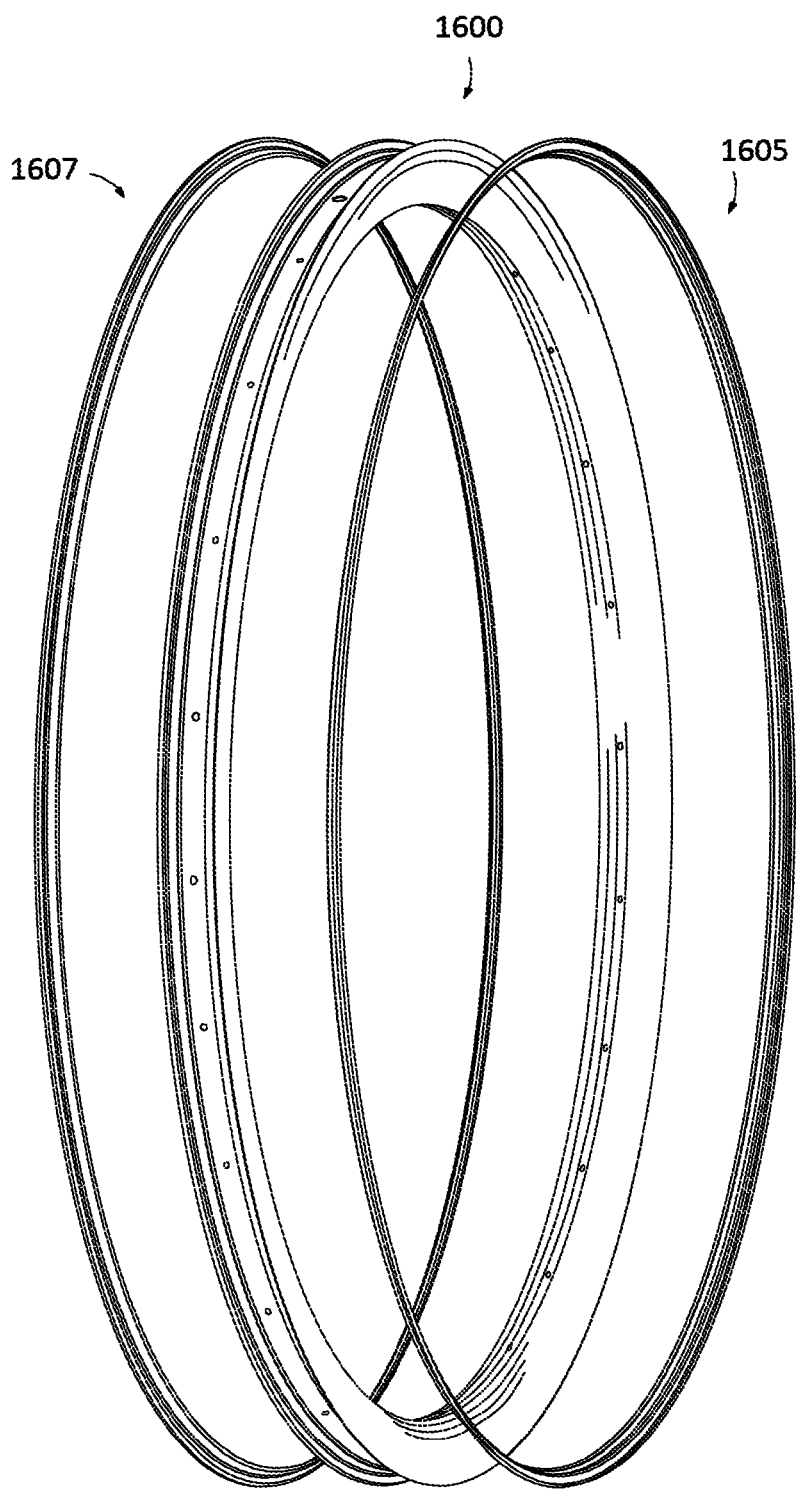
FIG. 17 is an exploded view of the rim and covers of FIG. 16.

FIG. 15 illustrates a rim 1500 provided with two covers that can be used with wheels rims. For example, in many embodiments, the rim 1500 can be similar to the rim 400 (FIG. 7), the rim 500 (FIG. 8), the rim 1300 (FIG. 13), and/or the rim 1400 (FIG. 14); and/or the covers can be similar to the covers 405 (FIG. 7), the covers 505 (FIG. 8), the covers 1305 (FIG. 13), and/or the covers 1405 (FIG. 14). In many embodiments, the rim 1500 can include an inner hook 1502 that enhances engagement with the tire.

FIGS. 16-20 illustrate a rim 1600 and first and second covers 1605, 1607. For example, in many embodiments, the rim 1600 can be similar to the rim 400 (FIG. 7), the rim 500 (FIG. 8) the rim 1300 (FIG. 13), the rim 1400 (FIG. 14), and/or the rim 1500 (FIG. 15); and/or the first and second covers 1605, 1607 can be similar to the covers 405 (FIG. 7), the covers 505 (FIG. 8), the covers 1305 (FIG. 13), and/or the covers 1405 (FIG. 14).

Figure 18:
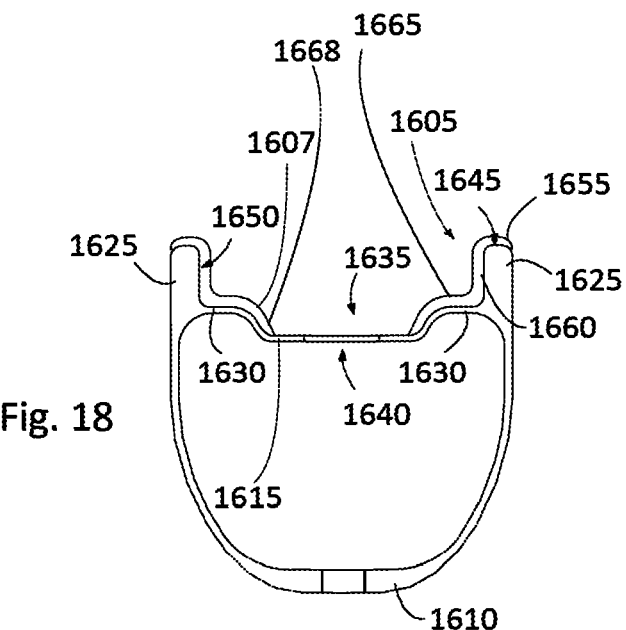
FIG. 18 is a section view of the rim (shown at a spoke hole of the rim) and covers taken along line 18-18 in FIG. 16 prior to installing the tape and with section lines omitted for clarity.

Referring to FIG. 18, the illustrated rim 1600 includes inner and outer walls 1610, 1615 and two annular features in the form of two projections 1625 extending radially outward from opposing lateral sides of the outer wall 1615 (relative to a central plane 1628). The outer wall 1615 defines two bead seats 1630 separated by a center well 1635 that has a series of spoke holes 1640. Each projection 1625 defines a radially outer face 1645 and a laterally inner face 1650. In these embodiments, the rim 1600 can be a standard clincher rim that can be used to hold a tire with or without the two covers 1605, 1607.

Referring still to FIG. 18, the covers 1605, 1607 can be separately engaged with portions of the outer wall 1610 and the protections 1625 of the rim 1600. Specifically, each of covers 1605, 1607 can include a first lateral portion 1655, a first radial portion 1660, a second lateral portion 1665, and a second radial portion 1668. The first lateral portion 1655 can be positioned to cover the radially outer face 1645 of the corresponding projection 1625. The first radial portion 1660 can be positioned to cover the laterally inner face 1650 of the corresponding projection 1625. The second lateral portion 1665 can be positioned to cover the corresponding bead seat 1630. The second radial portion 1668 can be positioned at least partially in the center well 1635.

The covers 1605, 1607 can be made from a material that is more resilient than the material of the rim. For example, the covers 1605, 1607 can be made from Ultra High Molecular Weight Polyethylene ("UHMW") that has a hardness of approximately 70 Rockwell R (approximately 80 Shore D). Other plastic or non-plastic material (e.g., Nylon, glass-filled Nylon, Acrylonitrile Butadiene Styrene ("ABS"), etc.) can be substituted for the UHMW material as long as the hardness is sufficient to support the tire pressure load generated by tire inflation, while still achieving a satisfactory seal (when used with a tubeless tire).

Figure 19:
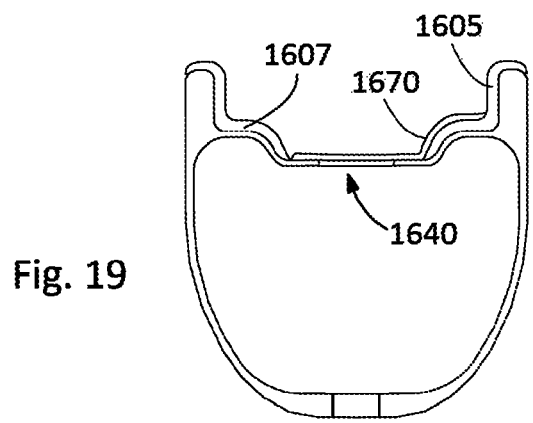
FIG. 19 is the section view of FIG. 18 with a first piece of tape installed, the thickness of the tape being shown not to scale.

The covers 1605, 1607 can be secured to the rim 1600 in an appropriate manner. For example, the covers 1605, 1607 may be co-molded to the rim 1600 or adhesively bonded to the rim 1600. In some embodiments, the covers 1605, 1607 can be secured to the rim 1600 using first and second pieces of adhesive tape 1670, 1675 wrapped circumferentially around the rim 1600 and covers 1605,1607. Referring to FIG. 19, the first piece of tape 1670 can be laid over the first cover 1605 and a portion of the center well 1635. The first piece of tape 1670 can have a width that covers both the second lateral portion 1665 and second radial portion 1668 of the first cover 1605 and can extend to a far side of the center well 1635. In this position, the first piece of tape 1670 can attach the first cover 1605 to the rim 1600, and in some embodiments, can cover the spoke holes 1640 to facilitate tubeless mounting of a tire.

Figure 20:
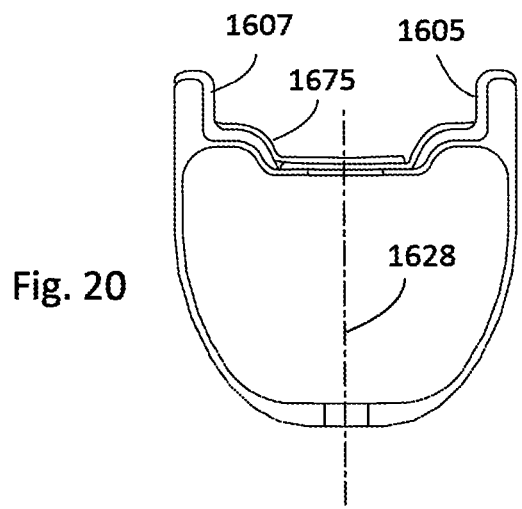
FIG. 20 is the section view of FIG. 19 with a second piece of tape installed, the thickness of the tape being shown not to scale.

Referring to FIG. 20, the second piece of tape 1675 can be laid over the second cover 1607 and a portion of the first piece of tape 1670 positioned in the center well 1635. The second piece of tape 1675 can have a width that covers both the second lateral portion 1665 and second radial portion 1668 of the second cover 1607 and can extend to a far side of the center well 1635. In this position, the second piece of tape 1675 can attach the second cover 1607 to the rim 1600, and in some embodiments, can provide an additional cover over the spoke holes 1640 to facilitate tubeless mounting of a tire.

In some embodiments, the cover 85 (FIGS. 2-4), the cover 205 (FIG. 5), the cover 305 (FIG. 6), the covers 405 (FIG. 7), the covers 505 (FIG. 8), the cover 605 (FIG. 9), the cover 705 (FIG. 10), the cover 1005 (FIGS. 11 & 12), the covers 1305 (FIG. 13), the covers 1405 (FIG. 14), the covers of the rim 1500 (FIG. 15), and/or the covers 1605, 1607 can include fiber reinforcement, such as carbon fiber, aramid fiber, or glass fiber, in a polymeric matrix. Implementing the fiber reinforcement can be advantageous to strengthen the cover 85 (FIGS. 2-4), the cover 205 (FIG. 5), the cover 305 (FIG. 6), the covers 405 (FIG. 7), the covers 505 (FIG. 8), the cover 605 (FIG. 9), the cover 705 (FIG. 10), the cover 1005 (FIGS. 11 & 12), the covers 1305 (FIG. 13), the covers 1405 (FIG. 14), the covers of the rim 1500 (FIG. 15), and/or the covers 1605, 1607. In these or other embodiments, implementing the fiber reinforcement can help secure the cover 85 (FIGS. 2-4), the cover 205 (FIG. 5), the cover 305 (FIG. 6), the covers 405 (FIG. 7), the covers 505 (FIG. 8), the cover 605 (FIG. 9), the cover 705 (FIG. 10), the cover 1005 (FIGS. 11 & 12), the covers 1305 (FIG. 13), the covers 1405 (FIG. 14), the covers of the rim 1500 (FIG. 15), and/or the covers 1605, 1607 to their rims. For example, the fiber reinforcement can apply elastic forces to the rims to help hold the cover 85 (FIGS. 2-4), the cover 205 (FIG. 5), the cover 305 (FIG. 6), the covers 405 (FIG. 7), the covers 505 (FIG. 8), the cover 605 (FIG. 9), the cover 705 (FIG. 10), the cover 1005 (FIGS. 11 & 12), the covers 1305 (FIG. 13), the covers 1405 (FIG. 14), the covers of the rim 1500 (FIG. 15), and/or the covers 1605, 1607 to their rims.

Various features of the invention are set forth in the following claims.

The invention claimed is:

1. A bicycle rim assembly adapted to be coupled to a hub to create a bicycle wheel, the bicycle rim assembly including:
   a rim defining a central plane and comprising:
      an annular inner wall;
      an annular outer wall cooperating with the inner wall to define a cavity, the annular outer wall including a first bead seat, a second bead seat, and a center well separating the first bead seat and the second bead seat; and
      a first annular projection and a second annular projection spaced laterally from each other relative to the central plane and extending substantially radially outwardly from the outer annular wall, each of the first annular projection and the second annular projection including a radially outer face and a laterally inner face, wherein the first bead seat is disposed laterally between the center well and the first annular projection, and the second bead seat is disposed laterally between the center well and the second annular projection;
   a right cover covering at least a portion of the laterally inner face of the first annular projection and at least a portion of the first bead seat of the rim, wherein the right cover is made from a material more resilient than a material of the rim; and
   a left cover covering at least a portion of the laterally inner face of the second annular projection and at least a portion of the second bead seat of the rim, wherein the left cover is made from a material more resilient than the material of the rim, wherein the left cover is spaced from the right cover;
   wherein each of the first annular projection and the second annular projection includes a laterally outer face, wherein at least a portion of the right cover is positioned over the laterally outer face of the first annular projection, and wherein at least a portion of the left cover is positioned over the laterally outer face of the second annular projection.

2. A bicycle rim assembly as claimed in claim 1, wherein:
   the right cover covers at least a portion of the radially outer face of the first annular projection; and
   the left cover covers at least a portion of the radially outer face of the second annular projection.

3. A bicycle rim assembly as claimed in claim 1, wherein:
   at least a portion of the right cover is positioned in the center well; and
   at least a portion of the left cover is positioned in the center well.

4. A bicycle rim assembly as claimed in claim 1, wherein:
   the right cover covers at least a portion of the radially outer face of the first annular projection;
   the left cover covers at least a portion of the radially outer face of the second annular projection;
   at least a portion of the right cover is positioned in the center well; and
   at least a portion of the left cover is positioned in the center well.

5. A bicycle rim assembly as claimed in claim 1, wherein:
   the right cover comprises an inner sidewall and an outer sidewall;
   the inner sidewall comprises a first radial dimension;
   the outer sidewall comprises a second radial dimension; and
   the first radial dimension is greater than the second radial dimension.

6. A bicycle rim assembly as claimed in claim 1, wherein:
   the right cover and the left cover do not cover the central well.

7. A bicycle rim assembly as claimed in claim 1, wherein:
   the right cover is fiber reinforced.

8. A bicycle rim assembly as claimed in claim 7, wherein:
   the right cover is configured to apply elastic forces on the first annular projection to secure the right cover to the first annular projection.

9. A bicycle rim assembly as claimed in claim 1, wherein:
   the left cover is configured to apply elastic forces on the second annular projection to secure the left cover to the second annular projection.

10. A bicycle rim assembly as claimed in claim 1, wherein:
    the right cover is fiber reinforced with at least one of carbon fiber, aramid fiber, or glass fiber arranged in a polymeric matrix.

11. A bicycle rim assembly as claimed in claim 1, further comprising:
a first piece of tape, wherein the first piece of tape covers at least part of the right cover and at least part of the central well.

12. A bicycle rim assembly as claimed in claim 11, further comprising:
a second piece of tape, wherein the second piece of tape covers at least part of the left cover and at least part of the central well.

13. A bicycle rim assembly as claimed in claim 12, wherein:
the second piece of tape covers at least part of the first piece of tape.

14. A bicycle rim assembly adapted to be coupled to a hub to create a bicycle wheel, the bicycle rim assembly including:
a rim defining a central plane and comprising:
an annular inner wall;
an annular outer wall cooperating with the inner wall to define a cavity, the annular outer wall including a first bead seat, a second bead seat, and a center well separating the first bead seat and the second bead seat; and
a first annular projection and a second annular projection spaced laterally from each other relative to the central plane and extending substantially radially outwardly from the outer annular wall, each of the first annular projection and the second annular projection including a radially outer face and a laterally inner face;
a right cover covering at least a portion of the laterally inner face of the first annular projection and the first bead seat; and
a left cover covering at least a portion of the laterally inner face of the second annular projection and the second bead seat, wherein the left cover is spaced from the right cover,
wherein:
the right cover is coupled to at least the first annular projection;
the left cover is coupled to at least the second annular projection;
the right cover covers at least a portion of the radially outer face of the first annular projection;
the left cover covers at least a portion of the radially outer face of the second annular projection;
at least a portion of the right cover is positioned in the center well; and
at least a portion of the left cover is positioned in the center well.

15. A bicycle rim assembly as claimed in claim 14, wherein:
the right cover and the left cover are fiber reinforced with at least one of carbon fiber, aramid fiber, or glass fiber arranged in a polymeric matrix.

16. A bicycle rim assembly adapted to be coupled to a hub to create a bicycle wheel, the bicycle rim assembly including:
a rim defining a central plane and comprising:
an annular inner wall;
an annular outer wall cooperating with the inner wall to define a cavity, the annular outer wall including a first bead seat, a second bead seat, and a center well separating the first bead seat and the second bead seat; and
a first annular projection and a second annular projection spaced laterally from each other relative to the central plane and extending substantially radially outwardly from the outer annular wall, each of the first annular projection and the second annular projection including a radially outer face and a laterally inner face;
a right cover covering at least a portion of the laterally inner face of the first annular projection and the first bead seat, wherein the right cover is made from a material more resilient than a material of the rim; and
a left cover covering at least a portion of the laterally inner face of the second annular projection and the second bead seat, wherein the left cover is spaced from the right cover, wherein the left cover is made from a material more resilient than the material of the rim;
wherein the right cover comprises an inner sidewall and an outer sidewall, the inner sidewall comprises a first radial dimension that extends along a direction parallel to the center plane and extends along an entire radial length of the inner sidewall, the outer sidewall comprises a second radial dimension that extends along a direction parallel to the center plane and extends along an entire radial length of the outer sidewall, and the first radial dimension is greater than the second radial dimension.

* * * * *